(12) United States Patent
Kielbasa et al.

(10) Patent No.: US 10,354,539 B2
(45) Date of Patent: Jul. 16, 2019

(54) SITUATIONAL AWARENESS ANALYSIS AND FATIGUE MANAGEMENT SYSTEM

(71) Applicant: BIOFLI TECHNOLOGIES, INC., San Diego, CA (US)

(72) Inventors: Michael P. Kielbasa, San Diego, CA (US); Matthew P. Kielbasa, San Diego, CA (US); Georg Schlueter, San Diego, CA (US)

(73) Assignee: BIOFLI Technologies, Inc., San Diego, CA (US)

( * ) Notice: Subject to any disclaimer, the term of this patent is extended or adjusted under 35 U.S.C. 154(b) by 250 days.

(21) Appl. No.: 14/733,446

(22) Filed: Jun. 8, 2015

(65) Prior Publication Data
US 2016/0358500 A1 Dec. 8, 2016

(51) Int. Cl.
*G09B 19/00* (2006.01)
*G09B 5/02* (2006.01)

(52) U.S. Cl.
CPC ..................... *G09B 5/02* (2013.01)

(58) Field of Classification Search
CPC ....... G09B 5/02; G09B 19/00; G06F 19/3437; G06F 7/00
See application file for complete search history.

(56) References Cited

U.S. PATENT DOCUMENTS

| 5,579,777 | A | 12/1996 | Suga |
| 7,621,871 | B2 | 11/2009 | Downs |
| 7,766,827 | B2 | 8/2010 | Balkin et al. |
| 2003/0018242 | A1 | 1/2003 | Hursh et al. |
| 2005/0033122 | A1 | 2/2005 | Balkin et al. |
| 2006/0200008 | A1 | 9/2006 | Moore-Ede |
| 2008/0004909 | A1 | 1/2008 | Jung et al. |
| 2009/0312998 | A1* | 12/2009 | Berckmans ......... G06F 19/3437 703/11 |

(Continued)

OTHER PUBLICATIONS

International Search Report received in application PCT/US16/36428, dated Sep. 7, 2016, 12 pages.

(Continued)

*Primary Examiner* — Eddy Saint-Vil
(74) *Attorney, Agent, or Firm* — Gary L. Eastman, Esq.; Eastman McCarney Dallmann LLP

(57) ABSTRACT

A situational awareness analysis and fatigue management system including a processor that receives input data from a user, generates a set of algorithms from the input data, calculates outputs of each of the set of algorithms, and generates and displays a dynamic assessment situational awareness (DASA) diagram of the user as a function of situational awareness performance and wakefulness hours of the user from the calculated output. Using the DASA diagram, the processor identifies situational awareness longevity conditions of the user to perform a task, forecasts advanced fatigue conditions of the user based on the identified situational awareness longevity conditions and identifies improvements of situational awareness performance of the user to perform the task. The processor displays the identified situational awareness longevity conditions, the forecast of advanced fatigue conditions and the improvements of situational awareness performance of the user to perform the task to one or more second users.

20 Claims, 20 Drawing Sheets

(56) References Cited

U.S. PATENT DOCUMENTS

| | | | |
|---|---|---|---|
| 2011/0212422 A1* | 9/2011 | O'Donnell | G09B 7/02 |
| | | | 434/236 |
| 2012/0065893 A1 | 3/2012 | Lee | |
| 2013/0209977 A1 | 8/2013 | Lathan et al. | |
| 2013/0304326 A1* | 11/2013 | Van Dongen | G06F 7/00 |
| | | | 701/42 |
| 2014/0361900 A1 | 12/2014 | Nothacker et al. | |
| 2014/0379275 A1 | 12/2014 | Yuen et al. | |
| 2015/0164418 A1* | 6/2015 | Johnson | G09B 5/02 |
| | | | 434/236 |

OTHER PUBLICATIONS

Dawson, Drew, "Quantitative Similarity Between the Cognitive Psychomotor Performance Decrement Associated With Sustained Wakefulness and Alcohol Intoxication", Queensland Mining Industry Health and Safety Conference Proceedings, pp. 31-41 (1998).

\* cited by examiner

SITUATIONAL AWARENESS ANALYSIS AND FATIGUE MANAGEMENT SYSTEM

BACKGROUND OF THE INVENTION

Field of the Invention

Embodiments of the invention generally relate to a situational awareness analysis and fatigue management system that includes a processor specifically configured to perform dynamic assessment of situational awareness (DASA) and identify situational awareness longevity conditions of a user, forecast advanced fatigue conditions of the user, and improve situational awareness performance of the user to perform a task. One or more embodiments may calculate one or more bio-inertia or "binertia" lines based on the response pitch time (RTP) of the user as a change in the user's response time per hour of wakefulness indicative of the user's longevity of effective performance. The binertia lines may be plotted for example as a function of the Response Wake Time (RWT) and RTP, on a dynamic psychomotor vigilance test (D-PVT) diagram to show performance regions indicative of best, good, poor or other regions related to effective performance. Specifically, but not by way of limitation, the system assesses the user's qualitative level of situational awareness across the user's wakefulness time, forecasts the time when the user may most likely experience the onset of fatigue, enables safer task scheduling, can be utilized in accident reconstruction efforts, for example aviation or public transportation accidents and can be utilized to increase the user's situational awareness capability and longevity to improve safety including safety in any endeavor, for example aviation safety.

Description of the Related Art

Generally, a variety of professions require "on duty" working hours for a certain amount of time or schedule including day shifts, night shifts, or both. Typically, extended periods of working hours may lead to fatigue and therefrom affecting a worker's alertness, awareness and performance. For example, insufficient sleep may lead to unsafe conduct during on duty hours due to sleep deprivation, leading to a higher risk of accidents.

Typically, maintaining performance and awareness during working hours relies on sleep behavior, time of day, wakefulness, perception, and other cognitive performance factors. Fatigued workers, generally, results in disorientation and loss of performance that may correlate with loss of performance from blood alcohol content. For example, pilots in charge of evening trip assignments without routinely monitoring their sleep behavior and wakefulness hours prior to the trips may lead to unsafe behavior affecting the pilot and personnel on board. With pilots crossing multiple time zones and sleeping at odd hours for inconsistent durations, this may cause dangerous levels of fatigue.

Generally, fatigue management systems rely mostly only on a user's sleep history to rate the user's cognitive performance United States Patent Publication 20120065893, to Lee, entitled "Method and Apparatus for Mitigating Aviation Risk by Determining Cognitive Effectiveness From Sleep History", describes a method and apparatus for managing fatigue. The system of Lee relies on sleep quantity, quality and interruptions, and outputs a user's cognitive effectiveness therefrom ranging from high to low. However, the system of Lee appears to lack any mention of accepting, a plurality of groups of user input data, calculating a user's response time to a series of tests, generating a set of algorithms therefrom, and forecasting advanced fatigue conditions and user situational awareness for a specific task.

U.S. Pat. No. 7,766,827, to Balkin et al., entitled "Method and System for Predicting Human Cognitive Performance", describes predicting cognitive performance of an individual using sleep history and time of day, and reconstructing past cognitive performance levels based on sleep history. However, the system of Balkin et al. appears to lack any mention of accepting, a plurality of groups of user input data, calculating a user's response time to a series of tests, generating a set of algorithms therefrom, and forecasting advanced fatigue conditions and user situational awareness for a specific task.

For example, United States Patent Publication 20030018242, to Hursh et al., entitled "Interface for a System and Method for Evaluating Task Effectiveness Based on Sleep Pattern", describes an interface for evaluating effectiveness of a person to perform a task based on sleep. According to Hursh et al., the results may be correlated to sunlight in the user's location, and may account for changes in the users location, sunlight during the user's sleep cycle, and other schedule modifying events. However, the system of Hursh et al. appears to lack any mention of accepting, a plurality of groups of user input data, calculating a user's response time to a series of tests, generating a set of algorithms therefrom, and forecasting advanced fatigue conditions and user situational awareness for a specific task.

United States Patent Publication 20060200008, to Moore-Ede, entitled "Systems and Methods for Assessing Equipment Operator Fatigue and Using Fatigue-Risk-Informed. Safety-Performance-Based Systems and Methods to Replace or Supplement Prescriptive Work-Rest Regulations", describes a system and method to assess and modify fatigue based on current worst-rest pattern and/or sleep data from an individual. The system of Moore-Ede combines the data to generate a fatigue assessment result, a diagnostic result and a corrective intervention result. However, the system of Moore-Ede appears to lack any mention of accepting, a plurality of groups of user input data, calculating a user's response time to a series of tests, generating a set of algorithms therefrom, and forecasting advanced fatigue conditions and user situational awareness for a specific task.

For example, U.S. Pat. No. 7,621,871, to Downs, entitled "Systems and Methods for Monitoring and Evaluating Individual Performance", describes a system for monitoring and evaluating cognitive effectiveness using a portable monitoring device that collects data from a user. However, the system of Downs appears to lack any mention of accepting, a plurality of groups of user input data, calculating a user's response time to a series of tests, generating a set of algorithms therefrom, and forecasting advanced fatigue conditions and user situational awareness for a specific task.

Therefore, in view of the above, there is a need for a system and method to determine and manage a user's situational awareness using a plurality of groups of user input data in addition to sleep patterns, and a plurality of tests and algorithms to forecast advanced fatigue conditions.

BRIEF SUMMARY OF THE INVENTION

One or more embodiments of the invention provide a situational awareness analysis and fatigue management system including a processor specifically configured to perform dynamic assessment of situational awareness (DASA) and identify situational awareness longevity conditions of a user, forecast advanced fatigue conditions of the user, and improve situational awareness performance of the user to perform a task. The term situational awareness and situation awareness may be used interchangeably in the specification and figures. In at least one embodiment, the processor receives input data from a user, wherein the input data includes a plurality of groups of input data. In one or more embodiments, the processor may generate a set of algorithms for each group of the plurality of groups of input data, calculate outputs of each of the set of algorithms from the input data, and, generate and display to the user the dynamic assessment situational awareness diagram, which is referred to as the DASA diagram herein, of the user as a function of situational awareness performance and wakefulness hours of the user from the output previously calculated. In one or more embodiments of the invention, the user may include a driver or pilot of a vehicle or any other type of operating equipment.

By way of at least one embodiment, using the DASA diagram, the processor may identify situational awareness longevity conditions of the user to perform a task. In one or more embodiments, using the DASA diagram, the processor may forecast advanced fatigue conditions of the user based on the identified situational awareness longevity conditions, and may identify improvements of situational awareness performance of the user to perform the task. In at least one embodiment, using the DASA diagram, the processor may display one or more of the identified situational awareness longevity conditions of the user, the forecast of advanced fatigue conditions of the user, and also display any improvements of situational awareness performance of the user to perform the task as calculated dynamically for example, to one or more second users.

According to one or more embodiments, the input data may include personal data of the user including one or more of height, weight and inseam of the user and a birth year and birth month of the user. In at least one embodiment, the processor may calculate one or more of age, body mass index (BMI), and skin-to-mass ratio (SMR) values of the user using the personal data. In one or more embodiments, the processor may calculate a bioelectric impedance (BEI) value and a proportionality factor of the (BEI) as a function of the calculated age, BMI and SMR values of the user.

By way of at least one embodiment of the invention, the processor may display a series of dynamic psychomotor vigilance tests (D-PVT) to the user, wherein the D-PVTs require the user to respond to stimulus. In one or more embodiments, the processor may calculate a D-PVT measure of the user's response time in responding to the stimulus, in milliseconds (msec), for each of the series of D-PVT. In at least one embodiment, the processor may generate and display a bar chart or any other type of display that includes the D-PVT measure calculated. In at least one embodiment, the input data received via the processor from the user includes the D-PVT measure.

In one or more embodiments of the invention, the processor may apply linear regression analysis to the bar chart to determine a trend of the user's response time as a function of wakefulness hours, and may display a trend line depicting the trend. In at least one embodiment, the processor may calculate a response time at wake-up (RTW) of the user. In one or more embodiments, the RTW is depicted on the bar chart as the trend line intercepts a y-axis of the bar chart at zero wakefulness hours. In at least one embodiment, the RTW indicates a user's situational awareness.

According to at least one embodiment of the invention, the processor may calculate a response time pitch (RTP) of the user as a change in the user's response time per hour of wakefulness. In one or more embodiments, the RTP indicates the user's longevity of effective performance. In at least one embodiment, the change in the user's response time includes an average rise in the user's response time. In one or more embodiments, the processor may calculate a bio-inertia as a product of the RTW and the RTP. In at least one embodiment, the processor may generate a dynamic psychomotor vigilance test (D-PVT) diagram displaying performance regions and bio-inertia response lines of the user using the calculated RTW, RTP and bio-inertia, or "binertia".

By way of one or more embodiments of the invention, the performance regions may include a plurality of regions indicating a user's performance based on the calculated RTW, RTP and bio-inertia. For example, in at least one embodiment, the performance regions may include a first performance region below a first pre-determined bio-inertia response line, as a first iso-binertia line, wherein the first performance region indicates a best performance of the user and a best response time of the user. In one more embodiments, for example, the performance regions may include a second performance region between the first iso-binertia line and a second bio-inertia response line, as a second iso-binertia line, wherein the second performance region indicates a good performance of the user and a good response time of the user. For example, in at least one embodiment, the performance regions may include a third performance region above the second iso-binertia line, wherein the third performance region indicates a poor performance of the user and a poor response time of the user.

In at least one embodiment of the invention, the input data received from the user may include sleep behavioral data of the user. In one or more embodiments, the processor may calculate one or more of daily sleep deprivation (DSD) and cumulative sleep deprivation (CSD) of the user using the sleep behavioral data. In at least one embodiment, the processor may calculate sleep deprivation of the user, from the sleep behavioral data, as a difference between a pre-defined number of hours, such as 8 hours, and actual hours slept.

According to one or more embodiments, the input data received from the user may include medication data of the user, wherein the medication data includes a drowsiness effect of the medication on the user.

In at least one embodiment of the invention, the input data received from the user may include wakefulness data including performance risk thresholds of the user, such as blood alcohol content (BAC) thresholds and pre-rapid-eye-movement (REM) stage (iREM) thresholds. In one or more embodiments, the iREM depicts wherein optical stimuli of the user are processed with a delay and a long response time or no response time from the user. By way of at least one embodiment, the processor may generate a situational awareness scale as a function of situational awareness and wakefulness hours of the user, depicting a plurality levels of situational awareness, such as four levels, associated with the performance risk thresholds of the user. In one or more embodiments, the plurality of levels of situational awareness may include a low performance risk threshold equivalent to a 0% BAC, a medium performance risk threshold equivalent to 0.04% BAC, a high performance risk threshold equivalent to 0.08% BAC, and a critical performance risk threshold equivalent to iREM.

BRIEF DESCRIPTION OF THE DRAWINGS

The above and other aspects, features and advantages of at least one embodiment of the invention will be more apparent from the following more particular description thereof, presented in conjunction with the following drawings, wherein.

DETAILED DESCRIPTION OF THE INVENTION

The following description is of the best mode presently contemplated for carrying out at least one embodiment of the invention. This description is not to be taken in a limiting sense, but is made merely for the purpose of describing the general principles of the invention. The scope of the invention should be determined with reference to the claims.

Figure 1:
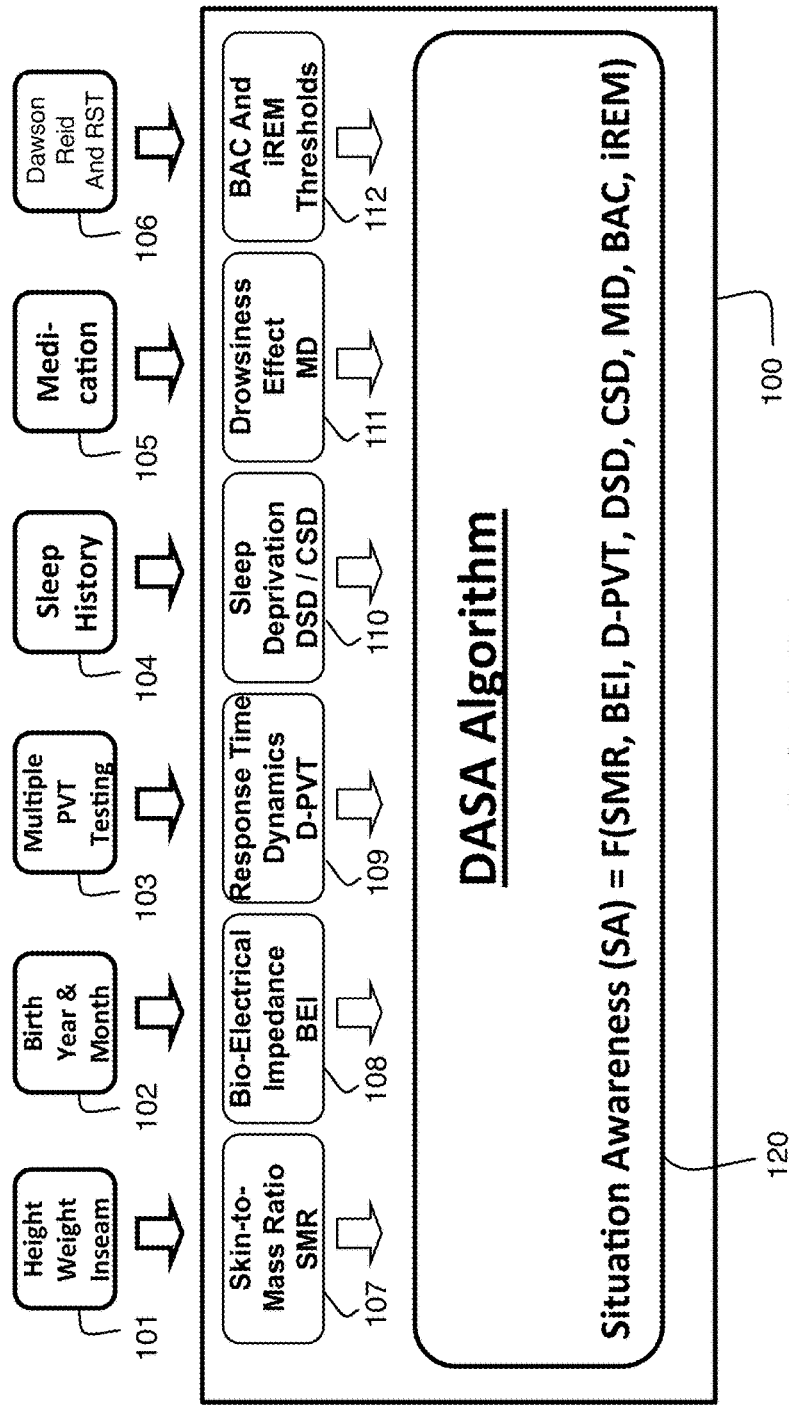
FIG. 1 shows an overall exemplary structural diagram of the situational awareness analysis and fatigue management system.
Figure 2:
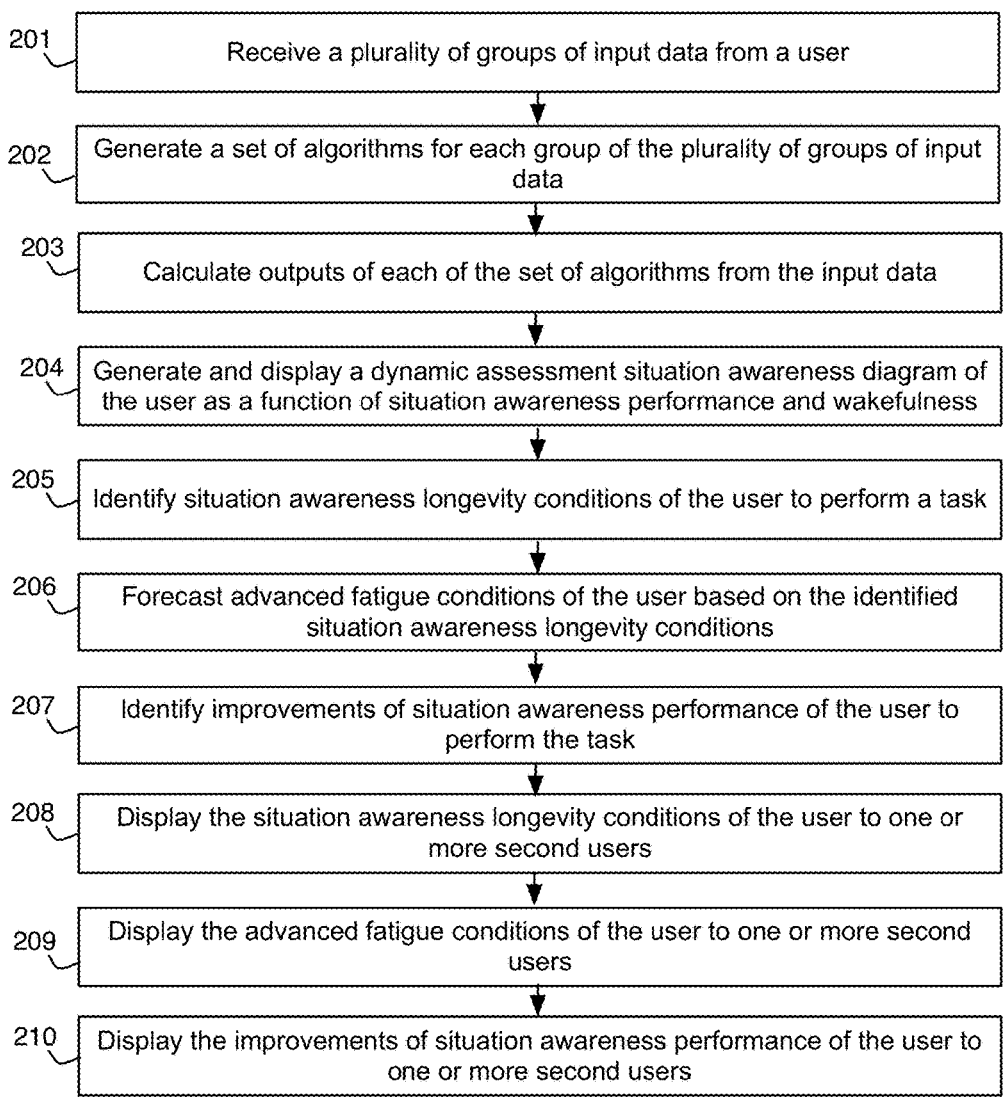
FIG. 2 shows an exemplary flow chart of the situational awareness analysis and fatigue management system.

FIG. 1 shows an overall exemplary structural diagram of the situational awareness analysis and fatigue management system, and FIG. 2 shows an exemplary flow chart of the situational awareness analysis and fatigue management system according to one or more embodiments of the invention.

As shown in FIG. 1, one or more embodiments of the invention provide a situational awareness analysis and fatigue management system including a processor 100. In at least one embodiment, the processor 100 receives input data from a user, wherein the input data includes a plurality of groups of input data. According to one or more embodiments, the input data may include personal data of the user including one or more of height, weight and inseam 101 of the user, gender of the user, and a birth year and birth month 102 of the user.

In at least one embodiment, the processor 100 may calculate one or more of age, body mass index (BMI), and skin-to-mass ratio (SMR) values 107 of the user using the personal data. In at least one embodiment of the invention, BMI may be calculated as function of the user's weight and height as $W/H^2$. In one or more embodiments of the invention, in calculating SMR, the processor 100 uses the user's weight and height, and an inseam by calculating lengths of the user's legs and arms, in order to calculate an accurate skin surface ratio. In at least one embodiment, the accurate skin surface ratio allows the processor 100 to calculate the user's SMR ($dcm^2/kg$), and calculate the user's skin workload as $1/SMR$ ($kg/dcm^2$). As such, in one or more embodiments, in calculating the user's BMI, the processor 100 may differentiate each user with the same weight and height using the lengths of the user's legs and arms. In at least one embodiment, the processor 100 may determine the effect of work-load on stress and sustainable wakefulness hours of the user to calculate situational awareness.

In one or more embodiments, the processor 100 may calculate a bioelectric impedance (BEI) value 108 and a proportionality factor of the (BEI) as a function of the calculated age, BMI and SMR values of the user. In at least one embodiment, the BEI strongly influences the flow of electrical current and therefore affecting the user's alertness and response time. In one or more embodiments, the processor 100 may use an algorithm to calculate a factor that characterizes the level of BEI without taking any measurements from the user to determine the BEI value 108. By way of at least one embodiment of the invention, the processor 100 may display a series of dynamic psychomotor vigilance tests (D-PVT) 103 to the user, wherein the D-PVTs require the user to respond to stimulus. In one or more embodiments, the processor 100 may calculate a D-PVT measure of the user's response time 109 in responding to the stimulus in milliseconds (msec), for each of the series of D-PVT. In at least one embodiment, the input data received via the processor 100 from the user includes the D-PVT measure.

In at least one embodiment of the invention, the input data received from the user may include sleep behavioral data or sleep history 104 of the user. In one or more embodiments, the processor 100 may calculate one or more of daily sleep deprivation (DSD) and cumulative sleep deprivation (CSD) 110 of the user using the sleep behavioral data or sleep history 104. In one or more embodiments of the invention, each day the user reports to work or to the assigned task, the user may access his or her account within the situational awareness analysis and fatigue management system and enter a time when the user went to sleep and when the user woke up in order to determine cumulative sleep. In at least one embodiment, the processor 100 may keep track of the user's sleep behavior and calculate the CSD accumulated during days prior to a current work day, and DSD defined by insufficient sleep during the night prior to the current work day. In at least one embodiment, the processor 100 may calculate sleep deprivation of the user, from the sleep behavioral data 104, for example using the calculated CSD and DSD, as a difference between a pre-defined number of hours, such as 8 hours, and actual hours slept. In one or more embodiments, in calculating sleep deprivation of the user, the processor 100 may consider that a sleep deprived user recovers from sleep deprivation one hour per day. For example, a 2-hour sleep deprivation repeated during each of four nights prior to a workday may result in a CSD of 8 hours minus 3 hours of recovery, therefore resulting in a remaining CSD of 5 hours.

According to one or more embodiments, the input data received from the user may include medication data 105 of the user, wherein the medication data 105 includes a drowsiness effect 111, and levels of drowsiness, of the medication on the user. In at least one embodiment of the invention, the input data received from the user may include wakefulness data 106 of the user including performance risk thresholds of the user, such as blood alcohol content (BAC) thresholds or equivalent blood alcohol content (E-BAC) and pre-rapid-eye-movement stage (iREM) thresholds 112. In one or more embodiments, the input data may be entered manually from the user, or may be obtained from previously stored data located within memory of the processor 100 or remotely.

In one or more embodiments, the processor 100 may generate an algorithm or a set of algorithms 120 for each group of the plurality of groups of input data, calculate outputs of each of the set of algorithms from the input data, and, generate and display to the user a dynamic assessment situational awareness (DASA) diagram of the user as a function of situational awareness performance and wakefulness hours from the output previously calculated of the user input parameters 101, 102, 103, 104, 105, 106, 107, 108, 109, 110, 111 and 112. In one or more embodiments, the function of situational awareness may include one or more of the user inputs and outputs calculated by the processor 100. By way of at least one embodiment of the invention, the algorithm 120 may be defined as:

Situational Awareness(SA)=$F$(SMR,BEI,D-PVT, DSD,CSD,MD,BAC,iREM)

In one or more embodiments, one or more of the set of algorithms 120 and the DASA diagram may be generated and displayed in a fully automated or semi-automated manner.

In at least one embodiment of the invention the processor 100 may analyze and manage user fatigue, for example used by a second user to check the user's alertness, wakefulness and longevity conditions against intended tasks or assignments. In one or more embodiments of the invention, the user may include a driver of an operating equipment, such as a pilot, captain or any other type of controller of a vehicle such as but not limited to a commercial vehicle driver, construction equipment driver or a supervisor thereof such as an air traffic controller, or any other type of user such as a factory worker, police officer, or any other user including any user operating a piece of equipment for example. In at least one embodiment, the second user may include one or more of human resources personnel, hiring personnel, a manager, dispatcher, supervisor or any other authoritative figure the user may report to. In one or more embodiments, the situational awareness analysis and fatigue management system is a DASA system. In at least one embodiment of the invention, the situational awareness analysis and fatigue management system may one or more of enhance accident reconstruction exercises, driver training situations, trip, assignment or task planning efforts and other industrial adaptations. In at least one embodiment, the situational awareness analysis and fatigue management system may one or more of reduce costs, business interruptions and insurance premiums, and improve employee comfort and satisfaction.

In at least one embodiment of the invention, the situational awareness analysis and fatigue management system may one or more of assess a user's qualitative level of situational awareness across the user's entire wakefulness time, forecast a time when the user may most likely experience onset of fatigue, and, assist human resources personnel, or other personnel, in their hiring or managing process as a tool to objectively determine a user's basic fitness for a pre-defined work shift. In one or more embodiments, the situational awareness analysis and fatigue management system may one or more of assist in trip planning and scheduling, lend evidence to accident reconstruction efforts, and instill motivation in improving a user's situational awareness capability and longevity during working hours.

As shown in FIG. 2, by way of at least one embodiment, using the DASA system, the processor 100 may receive a plurality of groups of input data from a user at 201, generate a set of algorithms for each group of the plurality of groups of input data at 202, calculate outputs of each of the set of algorithms from the input data at 203, and generate and display a dynamic assessment situational awareness or DASA diagram of the user as a function of situational awareness performance and wakefulness at 204. Embodiments of the invention may optionally calculate and/or generate a display of the D-PVT diagram of the user, calculate and/or generate a display of the binertia diagram of the user in step 204. In one or more embodiments of the invention, the groups of input data from the user may include one or more of physical data, behavioral data and physiological data. In at least one embodiment, the physical data may include one or more of the user's weight, height, inseam, age and gender. In one or more embodiments, the behavioral data may include one or more of sleep and rest periods, medication dosage and usage, eating habits and exercise habits. In at least one embodiment, the physiological data may include the D-PVT test data, and user the response time to the D-PVT tests.

As also shown in FIG. 2, in one or more embodiments, using the DASA diagram, the processor 100 may identify situational awareness longevity conditions of the user to perform a task at 205, forecast advanced fatigue conditions of the user based on the identified situational awareness longevity conditions at 206, and may identify improvements of situational awareness performance of the user to perform the task at 207. In at least one embodiment, using the DASA diagram, the processor 100 may optionally display one or more of the identified situational awareness longevity conditions of the user to one or more second users at 208, although this may be utilized for groups of people with similar physical, behavioral or physiological characteristics for example for correlation, error prediction, or data mining to determine what types of inputs or products may improve a particular type of user as previously determined for another user. The system may thus display the forecast of advanced fatigue conditions of the user to one or more second users at 209, and the improvements of situational awareness performance of the user to perform the task, to one or more second users at 210, again to optionally compare a give type of user to others for predictive or error corrective or data mining purposes or any other purpose.

Figure 3:
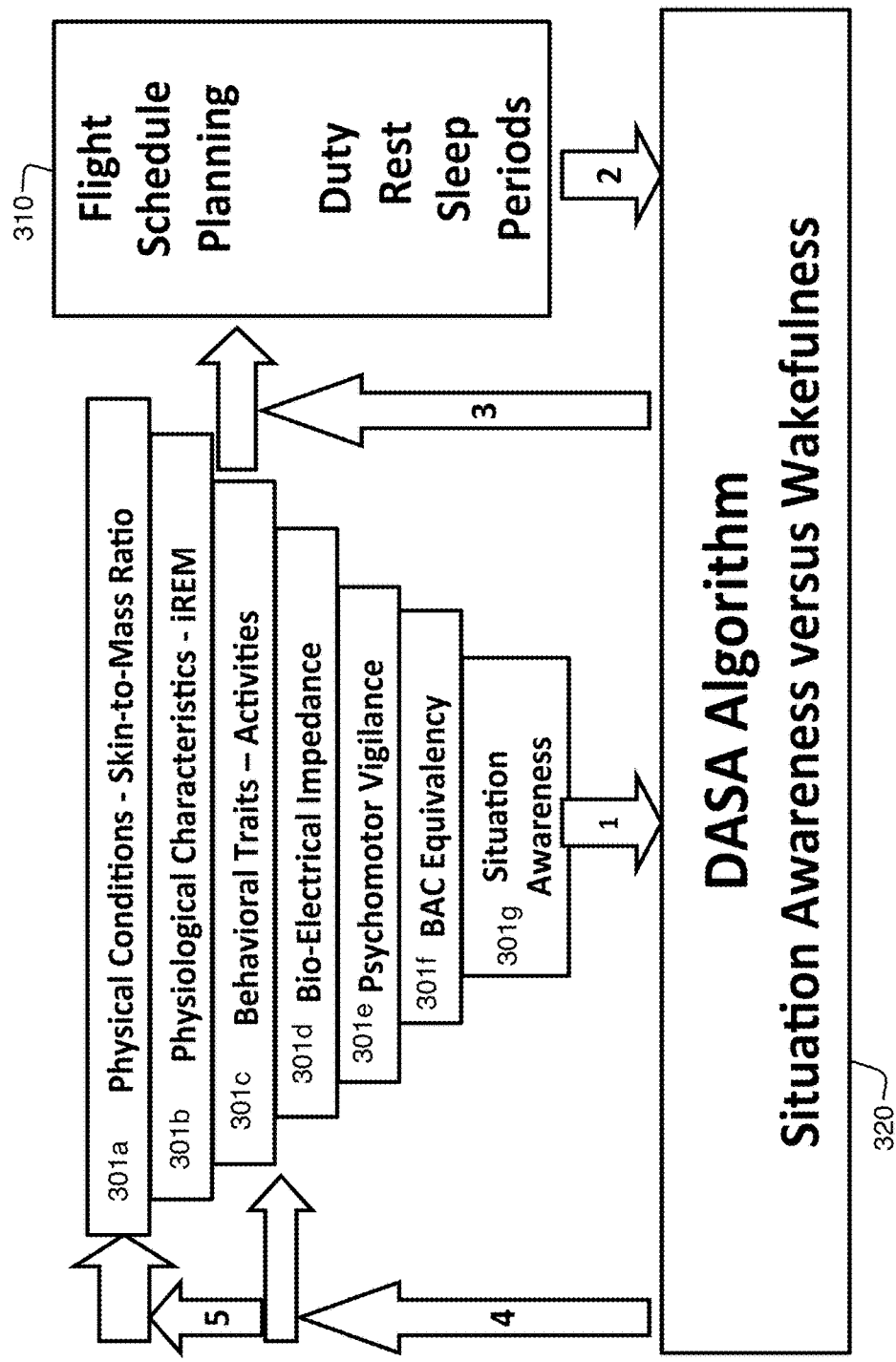
FIG. 3 shows an exemplary architectural diagram of the situational awareness analysis and fatigue management system.

FIG. 3 shows an exemplary architectural diagram of the situational awareness analysis and fatigue management system, according to one or more embodiments of the invention. As shown in FIG. 3, in at least one embodiment, using the processor 100, the DASA system provides information about a user's readiness for a pre-defined current or future task or assignment and provides insight into improvement opportunities for the user to increase alertness, situational awareness and readiness. In one or more embodiments of the invention, the DASA system accounts for a user's physical and mental conditions in a task program configuration, such that the processor 100 executes algorithms to one or more of reduce accident risks, illustrate where the user may engage in improvements to reduce accident risks, and illustrate how the user may earn pay incentives in doing so. In at least one embodiment, the DASA system may include a plurality of nested loops, such as four nested loops, to assist the user in identifying possible areas of improvement of his or her situational awareness capacity and/or his or her longevity on the current or future task or assignment.

As shown in FIG. 3, a user's personal data are entered into the DASA system including one or more of physical conditions 301a such as height, weight, inseam and SMR, physiological characteristics 301b such as iREM, behavioral traits and activities 301c, BEI 301d, dynamic psychomotor vigilance 301e, BAC equivalency 301f and situational awareness 301g. As shown in FIG. 3, Arrow 1 depicts the system's query or acceptance of the user's personal data entered into the system, wherein a user profile is developed and a DASA line is established therefrom. From Arrow 1, using such personal data, in at least one embodiment, the processor 100 may generate the DASA diagram using the DASA line as described above and as will be further described below.

In one or more embodiments, details of a pre-defined scheduled task 310 are accepted by the system as entered, manually or automatically into the DASA system, depicted by Arrow 2. In at least one embodiment, the details of a pre-defined scheduled task 310 may include flight or trip schedule planning details, schedule time, or any other assigned task details. In addition, the details of the pre-defined scheduled task 310 may include details of a duty or shift rest and sleep periods required to perform the pre-defined scheduled task 310. In one or more embodiments, using the details of a pre-defined scheduled task 310, the processor 100 determines a match or mismatch against the user's personal data entered at Arrow 1. The results obtained from Arrow 1 and Arrow 2, in at least one embodiment, are used by the processor 100 to calculate the DASA diagram and algorithm of situational awareness versus wakefulness 320. In at least one embodiment, through modifications of the pre-defined scheduled task 310 and iterations of the DASA system, the processor 100 may develop an acceptable task schedule using iteration loops and feedbacks, depicted by the arrows in FIG. 3. Embodiments of the system are not required to visually display the DASA diagram in order to utilize or otherwise assess situational awareness, and any other method of utilizing the calculations described herein are in keeping with the spirit of the invention.

In one or more embodiments, Arrow 3 represents a first feedback, wherein the processor 100 may alter the pre-defined scheduled task 310 and duty or shift rest, and sleep periods may be defined to insure that the user's situational awareness conditions do not enter into a high-risk region, as will be described in detail below. In at least one embodiment, Arrow 4 represents a second feedback as the processor 100 may illustrate to the user how his or her sleep behavior limits, his or her performance of an assigned task, shift or schedule, and his or her money earning potential, such that the user may be motivated to improve his or her sleep behavior, D-PVT response capability and other data that may result in improved situational awareness.

In one or more embodiments, Arrow 5 represents a third feedback wherein the processor 100 may depict to the user one or more performance limitations associated with his or her BMI and SMR, such that the user may be motivated to reduce his or her weight, or alter habits that affect the user's weight. In at least one embodiment, the DASA system may include a fourth feedback representing any improvements results from the first, second and third feedbacks that will eventually have an effect on trip or task schedule planning, and task assignments that allow the user to receive pay incentives.

Figure 4:
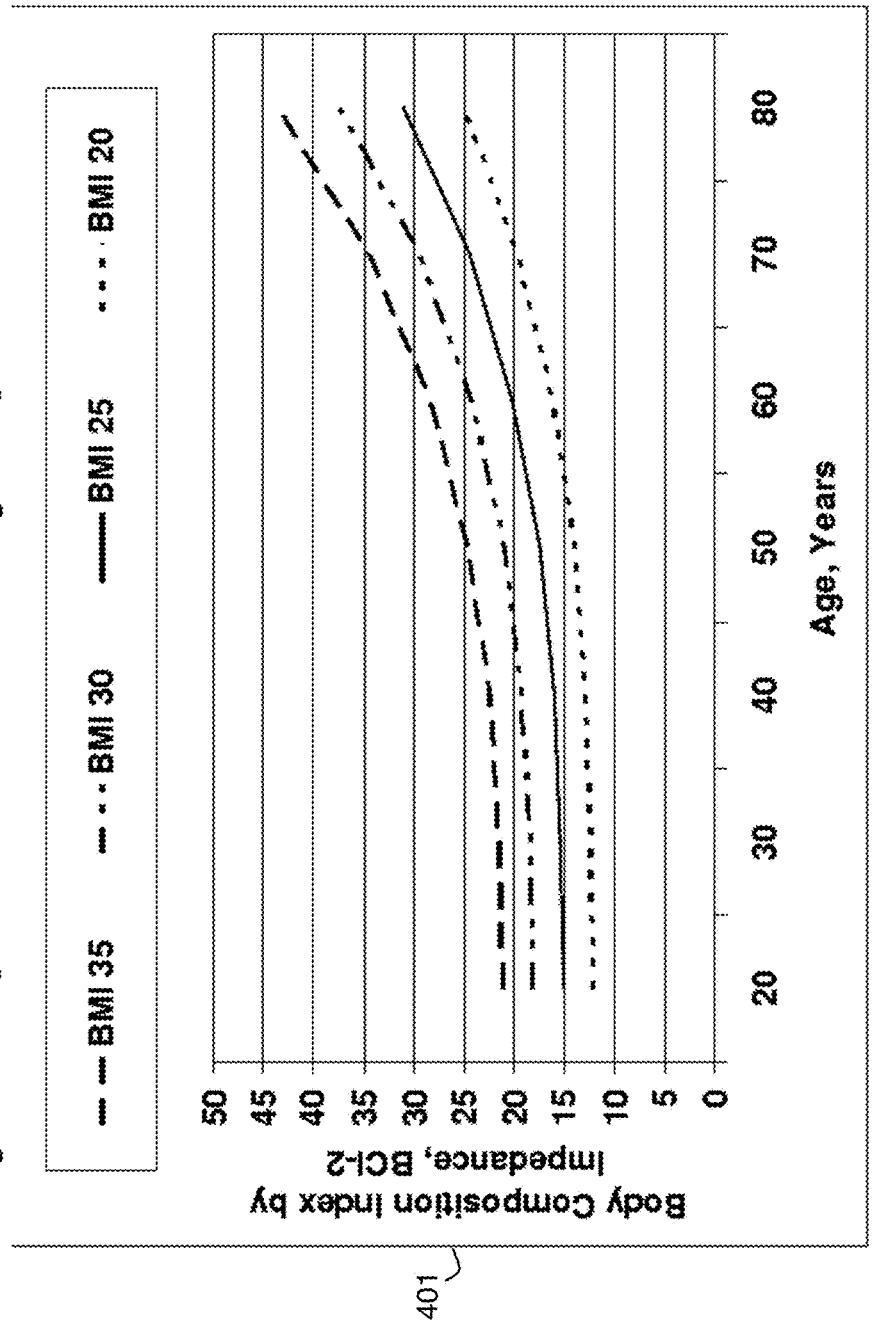
FIG. 4 shows an exemplary diagram displaying body composition index by impedance as a proportionality factor of bio-electrical impedance as a function of body mass index (BMI), skin-to-mass ratio (SMR) and age.

FIG. 4 shows an exemplary diagram displaying body composition index by impedance as a proportionality factor of bio-electrical impedance as a function of body mass index (BMI), skin-to-mass ratio (SMR) and age, according to one or more embodiments of the invention. In one or more embodiments, the processor 100 may generate an algorithm and diagram 401 defining a proportionality factor of bio-electrical impedance (BEI) as a function of BMI, SMR and age of the user. In one or more embodiments, BEI may indicate a flow of electrical current to receiving organs in the user's body that may affect the user's situational awareness. In at least one embodiment, using the algorithm, BEI may be affected by the user's body conditions such as BMI and 1/SMR. As shown in FIG. 4, in one or more embodiments, BEI may increase with age.

Figure 5:
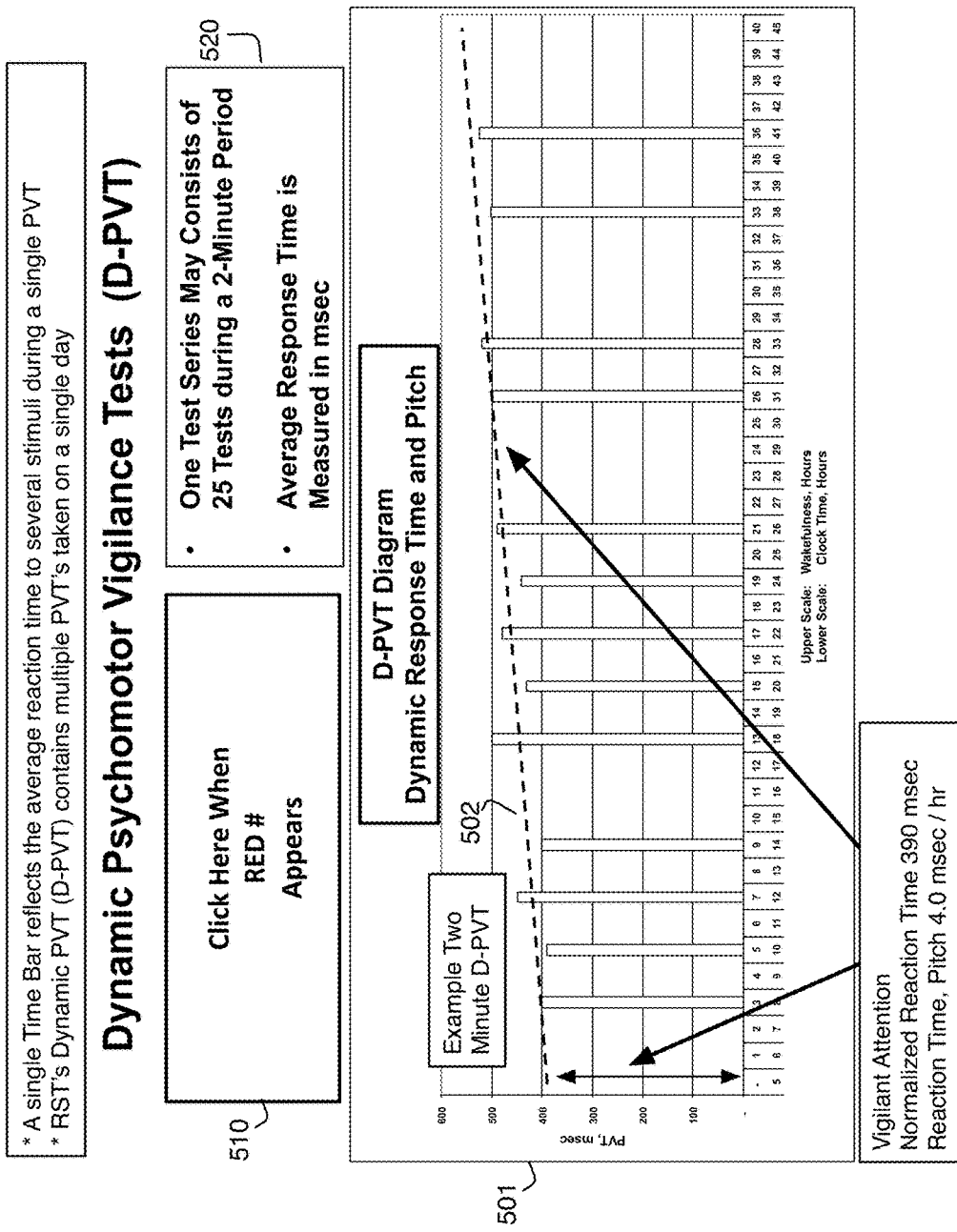
FIG. 5 shows an exemplary chart of a user's response time and pitch to dynamic psychomotor vigilance tests (D-PVT)

FIG. 5 shows an exemplary chart of a user's response time and pitch to dynamic psychomotor vigilance tests (D-PVT), according to one or more embodiments of the invention.

By way of at least one embodiment of the invention, the processor 100 may display a series of dynamic psychomotor vigilance tests (D-PVT) to the user, wherein the D-PVTs require the user to respond to stimulus. For example, as shown in FIG. 5, according to at least one embodiment, in one or more embodiments, one test may include a pre-defined number of stimulus response tests, such as 25 or 35 tests, during a pre-defined time period, such as a 2-minute period or a 3-minute period, respectively, shown at 520. In one or more embodiments, each D-PVT test may include a variable duration. In at least one embodiment, the duration of each D-PVT test may vary throughout the day. For example, in one or more embodiments, each D-PVT test may vary based on one or more time zones. In at least one embodiment of the invention, the DASA system may require the user to repeat the D-PVT tests multiple times during a day. For example, in one or more embodiments, the processor 100 may assign each D-PVT test to a specific hour on a wakefulness hour time scale, shown at 501 depicted by the various bars. In one or more embodiments the vertical axis may represent response time or change in response time for example. By way of at least one embodiment, the processor 100 may assign a cut-off threshold to one or more of the D-PVT tests. For example, in one or more embodiments, the cut-off threshold may include 100 millisecond (msec), such that D-PVT response measurements of less than 100 msec may be considered invalid. In at least one embodiment, the processor 100 may automatically set the cut-off threshold at different levels, or may allow a user to manually set the cut-off threshold at different levels.

In one or more embodiments, the processor 100 may calculate a D-PVT measure of the user's response time in responding to the stimulus, in milliseconds (msec), for each of the series of D-PVT. For example, in one or more embodiments, the processor 100 may display to the user a program requesting the user to tap on a field when the user recognizes an appearance of a red number, as shown at 510. In at least one embodiment, a pre-defined period of time for a test series may request a user to repeat the test a pre-defined number of times, for example a 2-minute test may request that the user repeat the process 25 times. In one or more embodiments of the invention, upon completion of the test, the processor 100 may provide an average response time during the test.

In at least one embodiment, the processor 100 may generate and display a bar chart including the D-PVT measure calculated, shown at 501. In at least one embodiment, the input data received via the processor 100 from the user includes the D-PVT measure. In one or more embodiments of the invention, using the user's entered personal data and sleep behavior data, as discussed above regarding FIGS. 1-3, the processor 100 may calculate one or more of an average response time during the day in msec, an hourly increase in response time in msec/hour, a response time at wakeup (RTW) in msec, and D-PVT performance regions and iso-binertia lines as will be discussed further below in association with FIG. 6.

In at least one embodiment of the invention, the processor 100 may indicate a worst response performance if both the RTW and the hourly increase in response time are high, and may indicate a best response performance if both the RTW and the hourly increase in response time are low. In one or more embodiments, the processor 100 may calculate a product of the response time upon wakeup and the hourly increase in response time, as response time multiplied with hourly response time change, defined as bio-inertia, as also defined as binertia.

In one or more embodiments of the invention, the processor 100 may apply linear regression analysis to the bar chart 501 to determine a trend of the user's response time as a function of wakefulness hours, and may display a trend line 502 depicting the trend. In at least one embodiment, the bio-inertia is depicted in FIG. 5 as the slope of the dotted trend line 502. In one or more embodiments, the RTW is depicted on the bar chart as the trend line 502 intercepts a y-axis of the bar chart at zero wakefulness hours. In at least one embodiment, the RTW indicates a user's situational awareness.

In one or more embodiments, the user's response time may get longer with wakefulness hours and may rise by X msec/hour of wakefulness, wherein the average rise is defined as response time pitch (RTP). According to at least one embodiment of the invention, the processor 100 may calculate the response time pitch (RTP) of the user as a change in the user's response time per hour of wakefulness.

For example, in at least one embodiment of the invention:

Response Time=$m$*Wakefulness Hours+$n$ where, m=Pitch (msec/hour); and,
n=(a constant)−(y-axis intercept), which is the Response Time at Wakeup (RTW).

In one or more embodiments of the invention, in determining the user's bio-inertia, the calculated RTW and RTP reflect the user's overall response and longevity capacity. In at least one embodiment, the processor 100 may interpret RTW as an indicator of situational awareness, and may interpret RTP as an indicator of the user's longevity of effective performance. In at least one embodiment, excellent user performance is reflected if both the RTW and the RTP are low, and poor user performance is reflected if both the RTW and the RTP are high. By way of one or more embodiments, the processor 100 calculates the bio-inertia as the product of RTW and RTP, defined by as binertia, wherein binertia (msec)=RTW (msec)*RTP (msec/hour).

For example:

Response Time=500 msec

Response Time Change=2 msec/hour

Bio-Inertia (Binertia)=500*2 msec/hour=1 msec/3,600;

wherein 1 msec/3,600=280 nanoseconds (n-sec).

Figure 6:
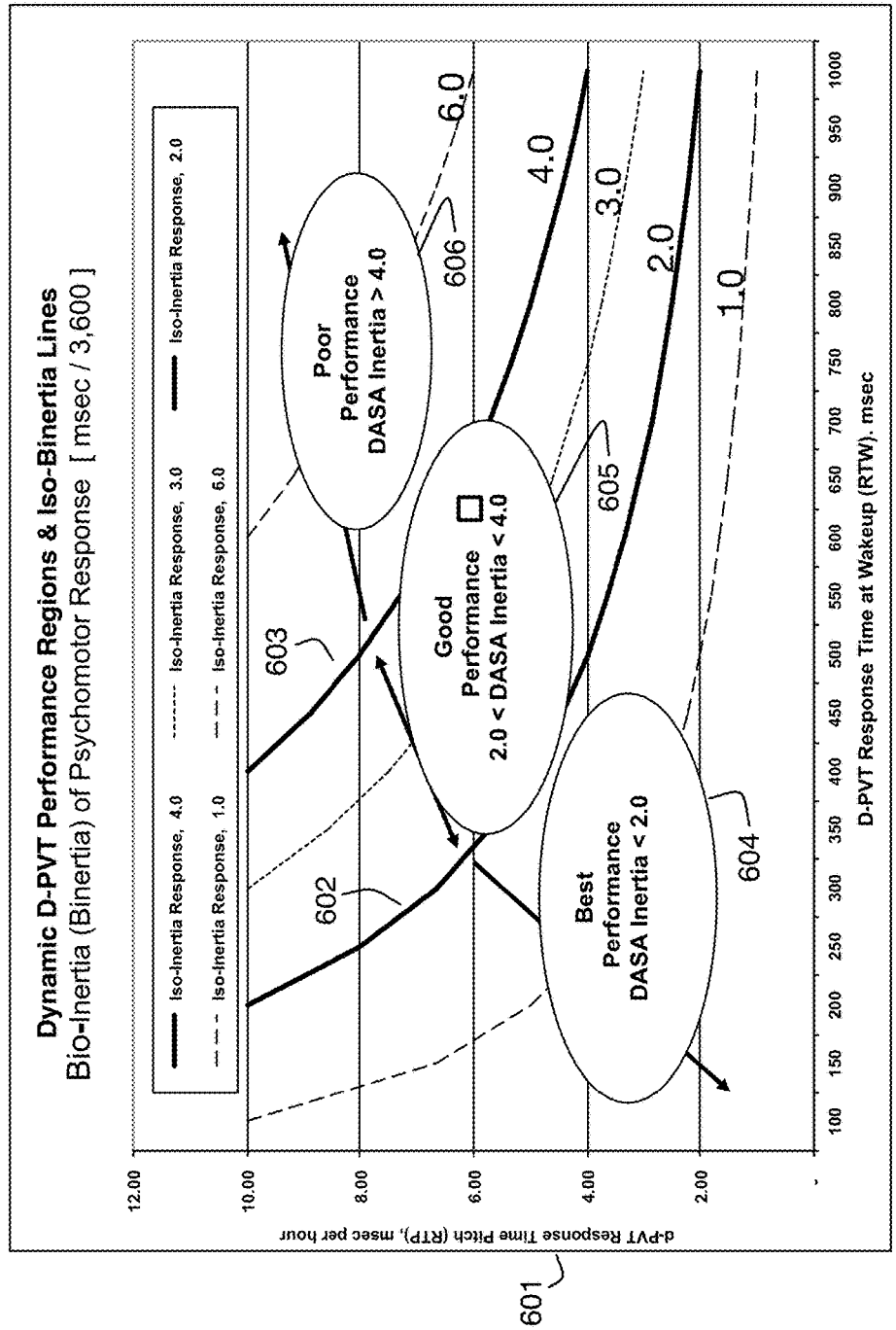
FIG. 6 shows an exemplary dynamic psychomotor vigilance test (D-PVT) diagram displaying performance regions and iso-binertia lines of the user.

FIG. 6 shows an exemplary dynamic psychomotor vigilance test diagram displaying performance regions and iso-binertia lines of the user, according to one or more embodiments of the invention.

In one or more embodiments, as discussed above, the processor 100 may calculate a bio-inertia as a product of the RTW and the RTP. In at least one embodiment, the processor 100 may generate a dynamic psychomotor vigilance test (D-PVT) diagram displaying performance regions and iso-binertia lines of the user using the calculated RTW, RTP and bio-inertia. In one or more embodiments of the invention, after the D-PVT tests and determined response stimulus, the processor 100 may automatically enter the resulting performance into the iso-binertia diagram 601 to visualize the user's response performance relative to the full performance possibility spectrum. By way of one or more embodiments of the invention, the performance regions may include a plurality of regions indicating a user's performance based on the calculated RTW, RTP and bio-inertia. According to at least one embodiment of the invention, as shown in FIG. 6, diagram 601 depicts two major pre-determined iso-binertia lines, 602 at 2 msec/3600 and 603 at 4 msec/3600, dividing the diagram 601 into a plurality of performance regions.

For example, in at least one embodiment, the performance regions may include a first performance region 604 below the first pre-determined iso-binertia line 602, wherein the first performance region 604 indicates a best performance of the user and a best response time of the user. In one more embodiments, for example, the performance regions may include a second performance region 605 between the first major pre-defined iso-binertia line 602 and the second major pre-defined iso-binertia line 603, wherein the second performance region 605 indicates a good performance of the user and a good response time of the user. For example, in at least one embodiment, the performance regions may include a third performance region 606 above the second pre-determined iso-binertia line 603, wherein the third performance region 606 indicates a poor performance of the user and a poor response time of the user. In one or more embodiments of the invention, iso-binertia lines, such as lines 602, 603, are lines with constant binertia values, wherein a product of RTP multiplied by RTW is constant. For example, in at least one embodiments, the iso-binertia lines are measured in nanoseconds (n-sec), wherein 1 msec/3,600 equals 280 nanoseconds (n-sec).

By way of at least one embodiment, the processor 100 may calculate the iso-binertia lines as RTP=F{(Selected Iso-Binertia Value)/RTW}.

For example:

Iso-Binertia=2.0 (msec/3600)

RTP(msec/hour)={[2.0(msec/3600)]/[RTW(msec)]}

In at least one embodiment of the invention, inserting values for RTW into the equation above results in RTP values that pair up with RTW for constant binertia values, as shown in FIG. 6. As shown in FIG. 6, according to one or more embodiments, the D-PVT performance diagram 601 depicts wherein the user stands regarding the user's overall response performance, and depicts improvement potential that may provide an incentive for improvement. In one or more embodiments, when the user improves his or her performance, the binertia diagram will reflect paths of improvements.

Figure 7:
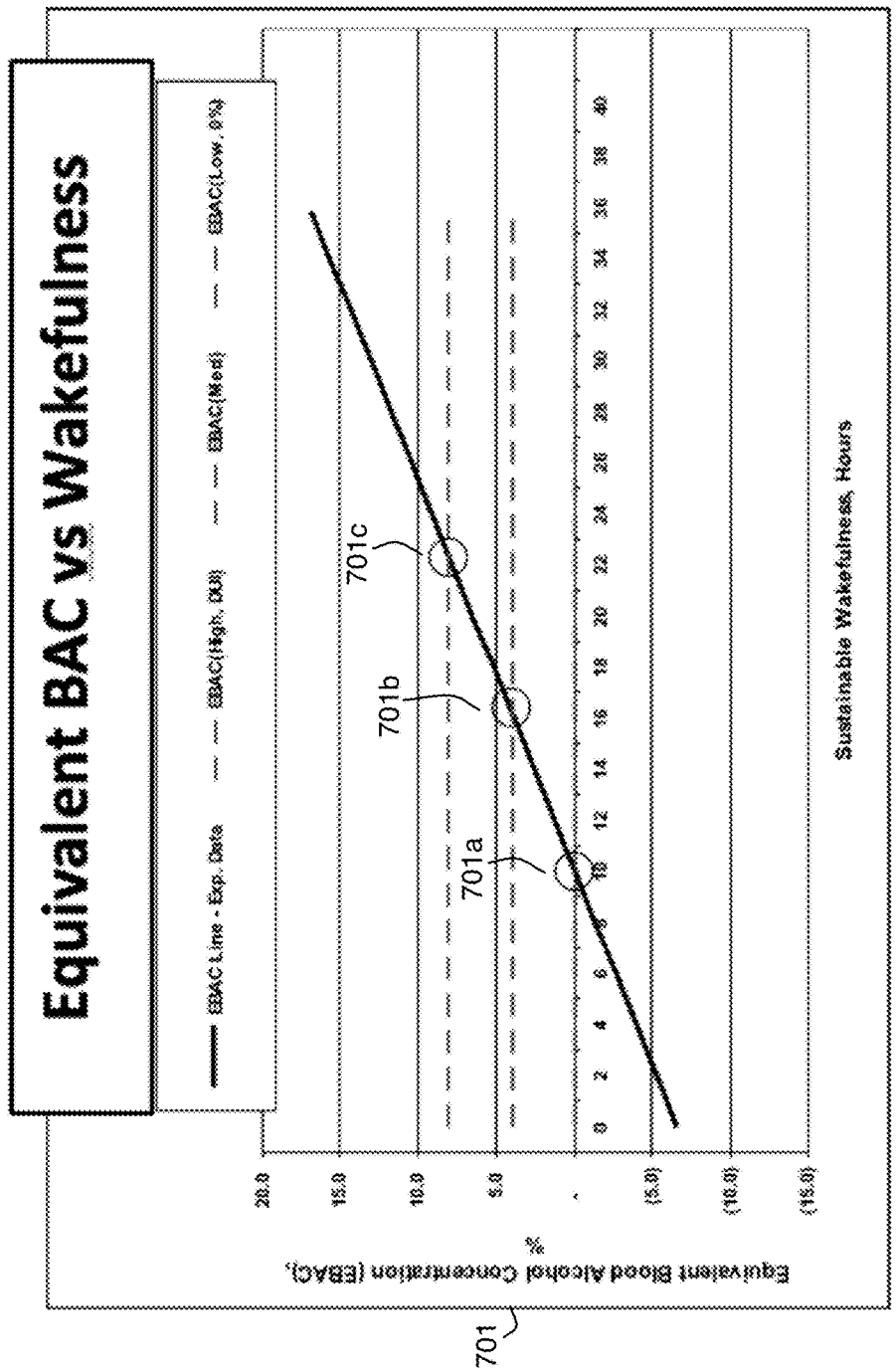
FIG. 7 shows an exemplary diagram of a correlation between blood alcohol content (BAC) and wakefulness hours.

FIG. 7 shows an exemplary diagram of a correlation between blood alcohol content (BAC) and wakefulness hours, according to one or more embodiments of the invention. According to at least one embodiment of the invention, the processor 100 may indicate the correlation between wakefulness hours and equivalent blood alcohol content (E-BAC). Such correlation has been described in "Quantitative Similarity Between the Cognitive Psychomotor Performance Decrement Associated with Sustained Wakefulness and Alcohol Intoxication", to Dawson, published 1998, which is incorporated herein by reference. For example, in one or more embodiments, 10 sustainable wakefulness hours may correlate with 0% E-BAC at 701a, 16-18 sustainable wakefulness hours may correlate with approximately 4% E-BAC at 701b, and 22-24 sustainable wakefulness hours may correlate with approximately 8% E-BAC at 701c, such as a driving under the influence (DUI) level. In at least one embodiment, the functionality depicted in FIG. 7 may indicate wherein human performance and equivalent BAC (E-BAC) are linked, such that while E-BAC is rising, human performance diminishes with wakefulness hours. Display of E-BAC for a user, even when no alcohol has been consumed provides a metric that users and supervisors may utilize to prevent accidents for example in an intuitive and easy to understand manner.

Figure 7A:
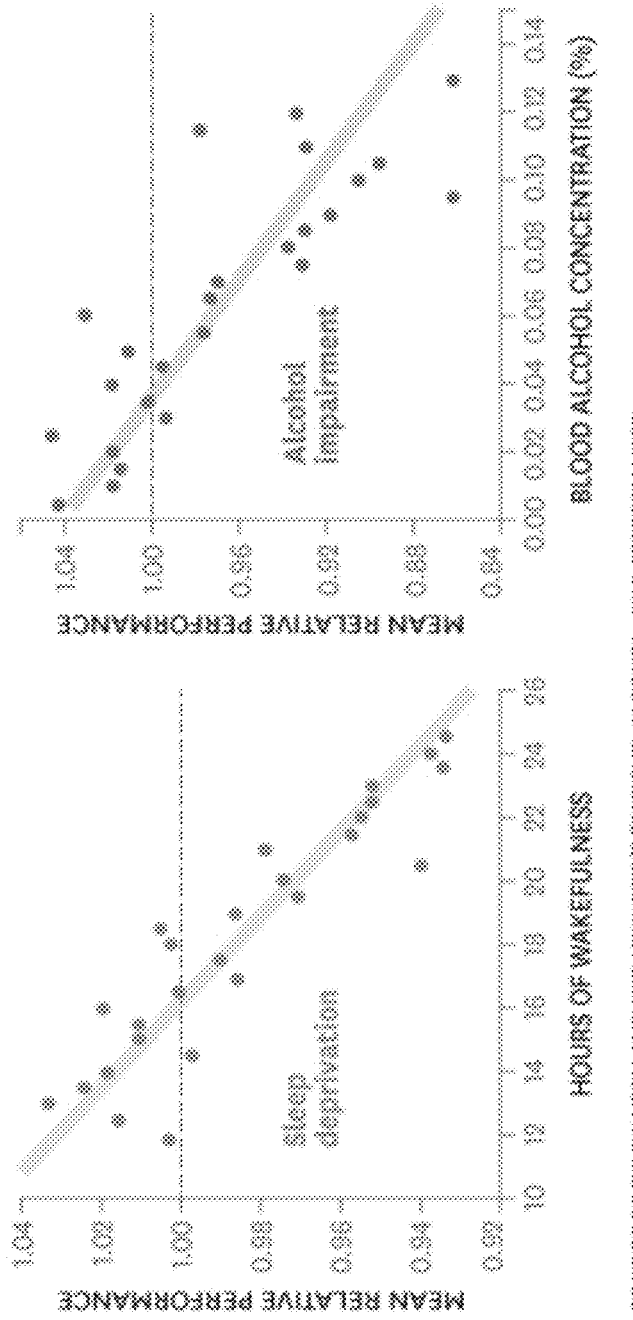
FIG. 7A shows a known relations of hours of wakefulness to blood alcohol equivalence from static performance results.

FIG. 7A shows a known relations of hours of wakefulness to blood alcohol equivalence from static performance results. The charts are taken from Drew Dawson and Kathryn Reid's "Fatigue, Alcohol, and Performance Impairment", Nature Vol. 388, July 1997. Issues related to performance known performance testing relate to tests before and after an event or static tests that do not include multiple tests over time to obtain dynamic performance results, for example that show the relative pitch of performance degradation.

Figure 8:
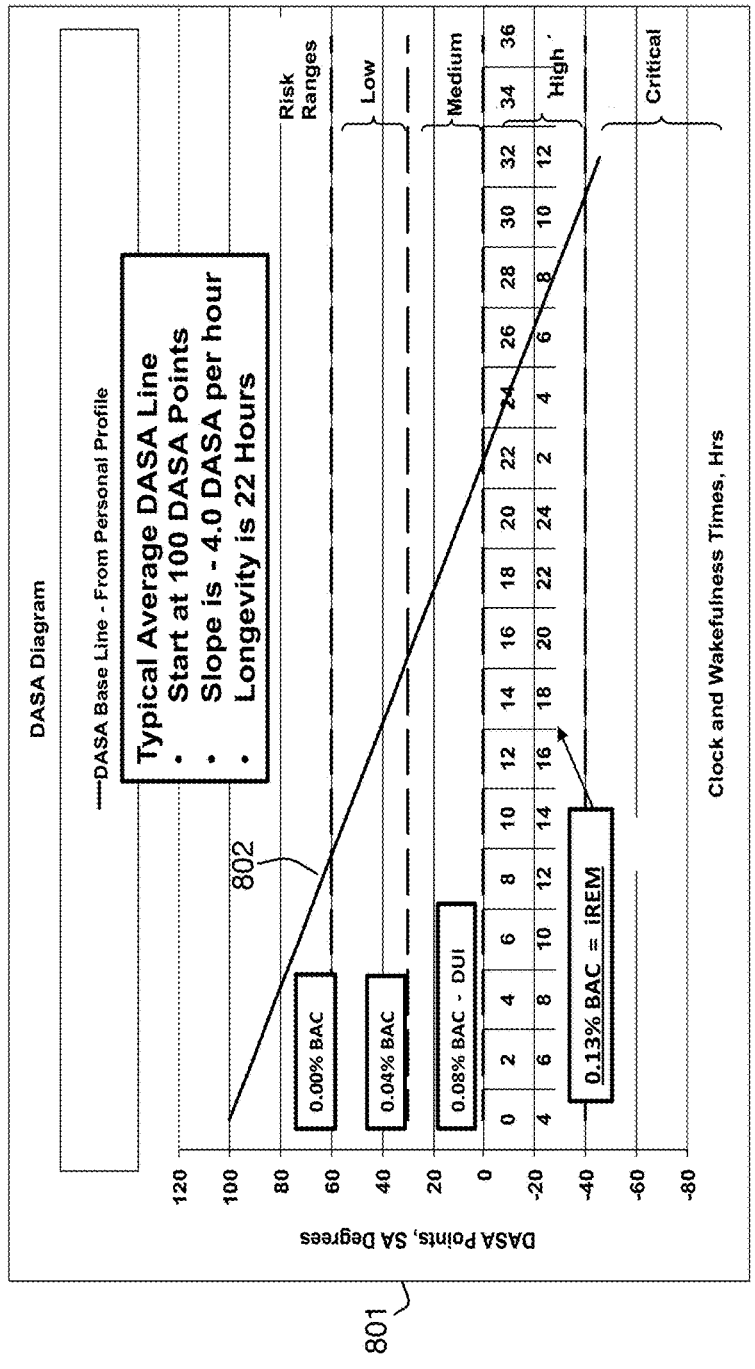
FIG. 8 shows an exemplary diagram of a dynamic assessment of situational awareness scale defining a base line and four levels of situational awareness associated with performance risk thresholds.

FIG. 8 shows an exemplary diagram of a dynamic assessment of situational awareness scale defining a base line and four levels of situational awareness associated with performance risk thresholds, according to one or more embodiments of the invention. According to one or more embodiments of the invention, FIG. 8 displays a user's level of Situational Awareness (SA) and its downhill path as a function of wakefulness hours across critical thresholds of impairment.

In at least one embodiment of the invention, the input data received from the user may include wakefulness data of the user including performance risk thresholds of the user, such as blood alcohol content (BAC) thresholds and pre-REM stage (iREM) thresholds. In one or more embodiments, the iREM is defined as a fatigue condition wherein a user's eyes are still open but the user's mind is not processing the visual information. In at least one embodiment, the iREM depicts wherein optical stimuli of the user are processed with a delay and a long response time or no response time from the user.

In at least one embodiment of the invention, the correlation between BAC and wakefulness hours is displayed as a rising function, wherein the E-BAC increases with the progression of wakefulness as the user experiences fatigue. In one or more embodiments, situational awareness (SA) may be quantified in the form of DASA points, wherein an average user's SA performance starts with 100 DASA points. By way of one or more embodiments of the invention, the DASA system illustrates a natural decrease in useful user performance with the progression of wakefulness, generating the 100-point DASA scale as shown in FIG. 8.

According to at least one embodiment of the invention, as shown in FIG. 8, a user starts at 100 DASA points and reaches zero DASA points at a wakefulness time that coincides with the equivalent BAC (E-BAC) of 0.08%. In one or more embodiments of the invention, the processor 100 may enter the user's D-PVT results, wherein the series D-PVT test response time in msec is used to adjust the starting DASA points. For example, in at least one embodiment of the invention, a low response time from the user may raise the starting DASA points to 110 or 120, from 100. For example, in one or more embodiments, a low series D-PVT test degradation per hour may increase the useful wakefulness hours, or longevity, of the user beyond a pre-defined value of an average user's longevity. In at least one embodiment of the invention, the processor 100 may generate the DASA point scale shown in FIG. 8 representing the degree of situational awareness capability, as a dynamic assessment of situational awareness diagram 801, depicting a down-sloping DASA line 802. By way of one or more embodiments, as shown in FIG. 8, the DASA line 802 may represent a user's steadily diminishing situational awareness, wherein the DASA line crosses a threshold of beginning equivalent BAC (E-BAC) and eventually 0.08% BAC. As shown in FIG. 8, according to at least one embodiment of the invention, the processor 100 may calculate wherein the beginning of equivalent BAC (E-BAC) may begin at 10 hours of wakefulness at 60 DASA points (60% of full SA), and 0.08% BAC is reached at 22 hours of wakefulness at 0 DASA points (0% of wakefulness). As shown in FIG. 8, the diagram 801 depicts wherein iREM is reached after 30 hours of wakefulness at −40 DASA points.

By way of at least one embodiment, the processor 100 may generate a situational awareness scale as a function of situational awareness and wakefulness hours of the user, depicting a plurality levels of situational awareness (SA), such as four levels, associated with the performance risk thresholds of the user, shown as diagram 801. In one or more embodiments, the plurality of levels of situational awareness may include a low performance risk threshold equivalent to a 0% BAC, a medium performance risk threshold equivalent to 0.04% BAC, a high performance risk threshold equivalent to 0.08% BAC, and a critical performance risk threshold equivalent to iREM.

For example, according to one or more embodiments of the invention:

Low Risk Threshold: $SA_{0.00\%\ BAC}=100*[1-10/22]$
=54.5DASA Points

Medium Risk Threshold: $SA_{0.04\%\ BAC}=100*[1-16/22]=27.2$DASA Points

High Risk Threshold: $SA_{0.08\%\ BAC}=100\times[1-22/22]$
=0.0DASA Points

Critical Risk Threshold(iREM): $SA_{A\ \%\ BAC}=100\times[1-B/22]$ where, A=E-BAC threshold corresponding to iREM conditions and;
B=hours of wakefulness where iREM conditions are most likely to occur.

In at least one embodiment of the invention, parameter A may be approximately or equal to 0.14% BAC, and parameter B may be approximately or equal to 31 hours of wakefulness. As such, for example, in one more embodiments of the invention:

with A=0.14% BAC;
the processor 100 calculates wherein B=22.0+12/8*6=22.0+9.0=31 hours of wakefulness; and,
$SA_{iREM}=-54.5*12/8=-40.9$ DASA points.

By way of at least one embodiment of the invention, the processor 100 associated each user with specific user performance characteristics depending on the user's sleep deprivation, stress level, medication or drug usage that may cause drowsiness effects, and the user's individual dynamic response characteristics obtained from the D-PVTs, including RTW and RTP. In one or more embodiments, the processor 100 may generate a diagram depicting the effects of the user's individual performance characteristics, dynamic PVT characteristics (D-PVT) and sleep deprivation, as shown in FIG. 9.

Figure 9:
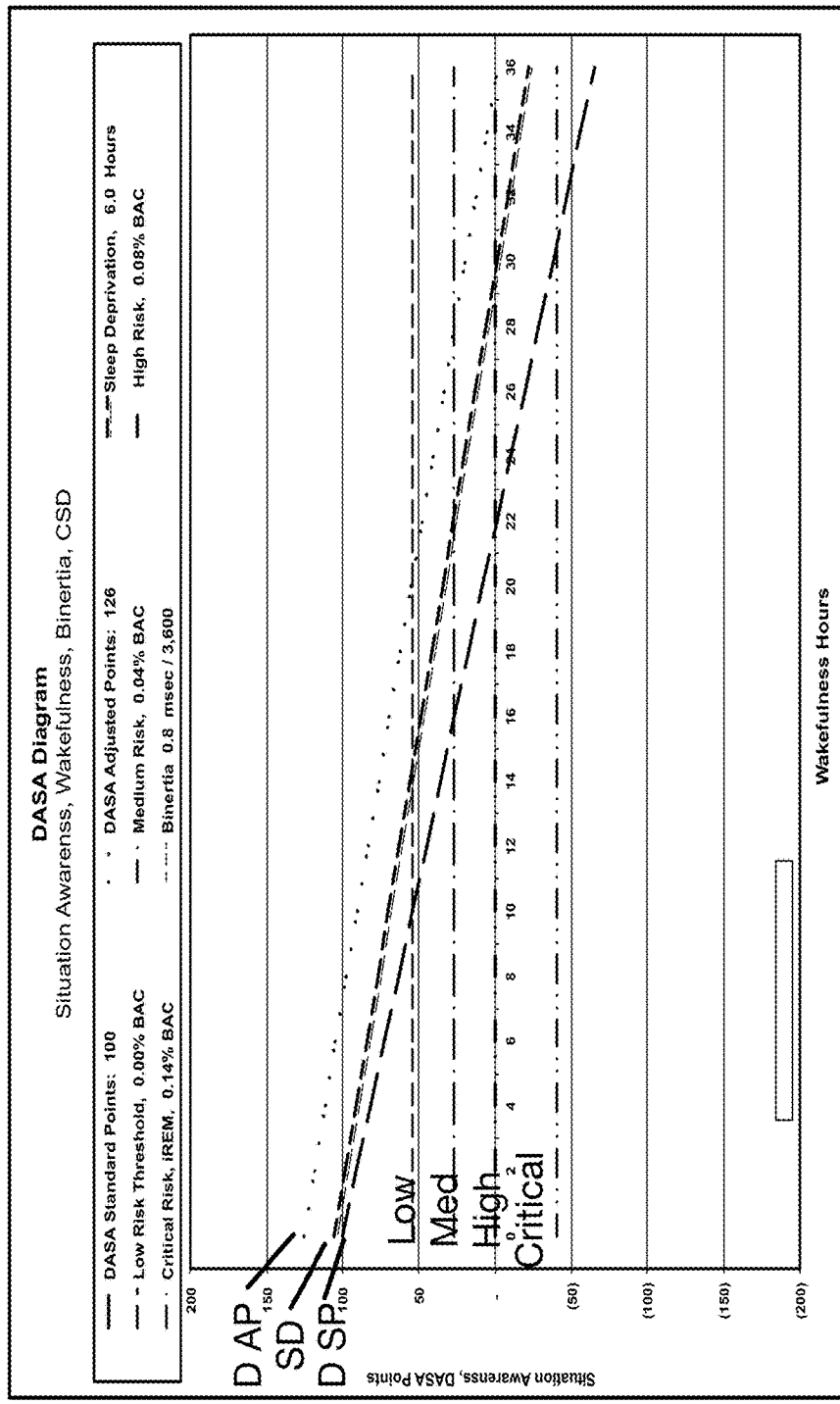
FIG. 9 shows an exemplary diagram of the dynamic assessment of situational awareness scale with adjusted base line points based on iso-binertia lines and cumulative sleep deprivation of the user.

FIG. 9 shows an exemplary diagram of the dynamic assessment of situational awareness scale with adjusted base line points based on iso-binertia lines and cumulative sleep deprivation of the user, according to one or more embodiments of the invention.

Figure 10:
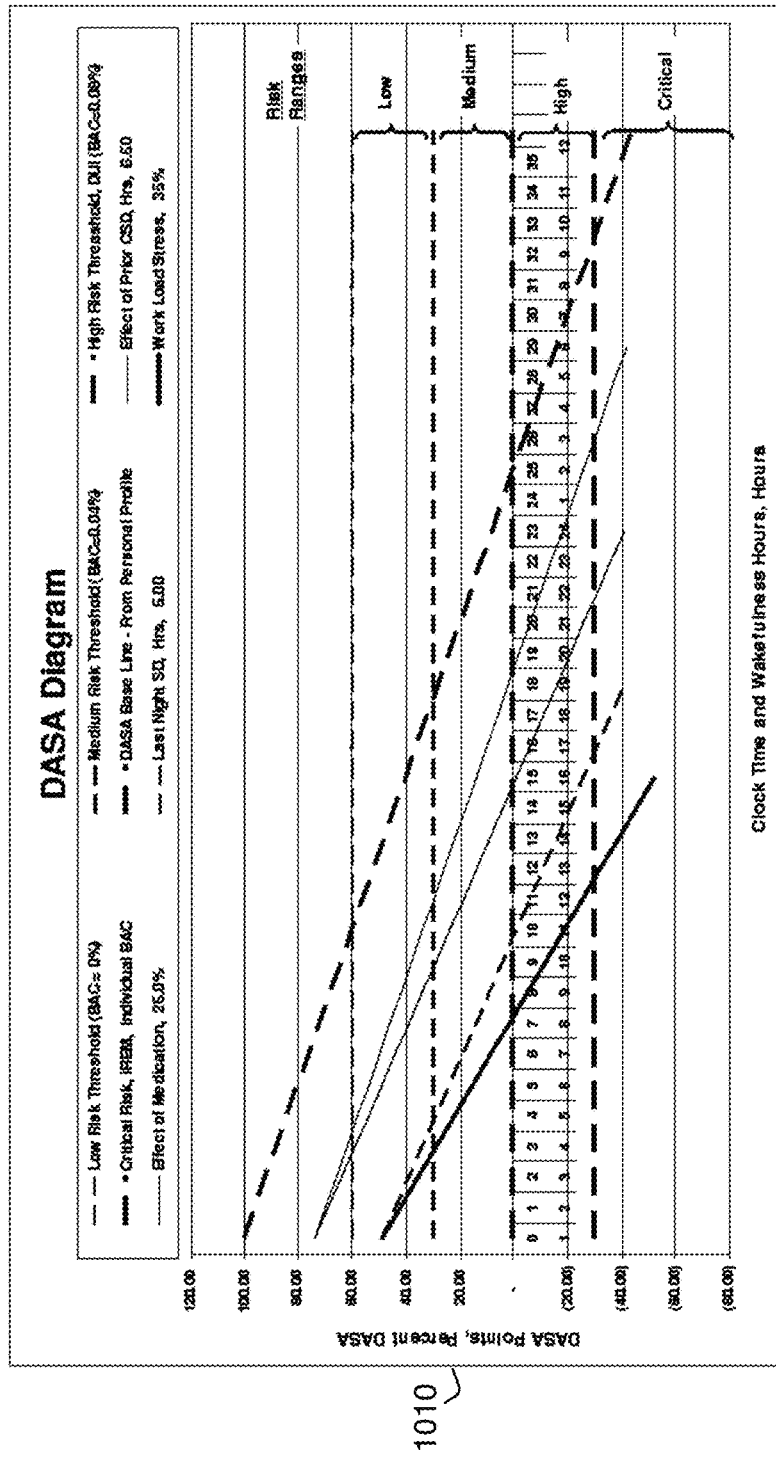
FIG. 10 shows an exemplary diagram of the dynamic assessment of situational awareness scale with an adjusted base line based on sleep deprivation, medication and stress data.

FIG. 10 shows an exemplary diagram of the dynamic assessment of situational awareness scale with an adjusted base line based on sleep deprivation, medication and stress data, according to one or more embodiments of the invention.

As shown in FIG. 9, in one or more embodiments, D-PVT characteristics may affect the DASA performance line, depicted in FIG. 8 as 802. In at least one embodiment of the invention, as shown in DASA diagram 901, the RTW may shift the DASA performance line up or down depending on whether the user's Response Time at Wakeup (RTW) is shorter or longer than a standard level. In one or more embodiments, as shown in the DASA diagram 901, the user's Response Time Pitch (RTP) affects a DASA Line Pitch accordingly.

For example, in at least one embodiment of the invention, the processor 100 may calculate a DASA starting value, wherein the effect of RTW on the DASA performance line may be represented as:

DASA Line Points=$100*[1+C\times(1-(RTW_{Eff}/D)]$;

where, C=a coefficient;
$RTW_{Eff}$=the user's effective RTW; and,
D=the standard RTW value.

By way of one or more embodiments, according the DASA starting value, the entire DASA performance line may be shifted up or down. For example, as shown in FIG. 9, in at least one embodiment of the invention, the DASA performance line is shifted upward to a starting value equivalent to 126% of the standard value, such that the DASA performance line starts at 126 DASA points.

For example, in at least one embodiment of the invention, the processor 100 may calculate a DASA line pitch, wherein the effect of RTW on the DASA performance line may be represented as:

DASA Line Pitch (DLP)=$-E\times\{1+F\times(RTP_{Eff}/4)-1\}$;

where, E=standard DASA Line Pitch (for example −4.55/hour);
F=a coefficient; and,
$RTW_{Eff}$=the user's effective RTP.

By way of one or more embodiments, according the DASA Line Pitch, the entire DASA performance line is adjusted accordingly. For example, as shown in FIG. 9, in at least one embodiment of the invention, the DASA performance line may have a lesser pitch and reaches the high threshold level, or DUI level, at 36 hours of wakefulness.

In at least one embodiment of the invention, for a specific user's effective DASA diagram, the DASA system enters the serial D-PVT test results into the DASA diagram 1010, shown in FIG. 10 for example. In one or more embodiments, the processor 100 may use the D-PVT test results response time (msec) to adjust the starting DASA points. For example, in one or more embodiments, a low response time may raise the starting DASA points to 110 or 120, and a low D-PVT degradation per hour may increase the useful wakefulness hours, or longevity, beyond that of an average user. By way of one or more embodiments, the processor 100 may adjust the basic or average performance line based on recorded sleep deprivation, regularly used medication that may cause drowsiness, and high workload and corresponding stress.

For example, in at least one embodiment of the invention, the processor 100 may calculate a user's effective wakefulness time, wherein the effect of sleep deprivation on the DASA performance line may be represented as:

Effective Wakefulness Time=Normal Wakefulness Time−$G\times$CSD;

CSD=DSD*5−$H$*4 where, G=a coefficient; and,
H=a coefficient.

In at least one embodiment, the processor 100 may measure sleep deprivation in hours, wherein sleep deprivation may affect the DASA performance line accordingly, and wherein the effective performance time is reduced accordingly.

By way of one or more embodiments, using the CSD formula, the processor 100 may assume that a user's DSD is consistently the same each night and that the user's body recovers from sleep deprivation at a rate of B hours per day.

In at least one embodiment of the invention, at low pitches of the DASA performance line, affected by a low value of RTP, the DASA performance line approached a near-horizontal condition. In one or more embodiments, at a near-horizontal condition, a penalty on the situational awareness as affected by sleep deprivation, which is proportional to the Pitch of the DASA performance line, is very small.

In at least one embodiment, the effect or penalty on the user's situational awareness (SA) may be represented SA Penalty (DASA Points)=DASA Line Pitch (DLP)*CSD. For example, in one or more embodiments, with CSD=6 hours and DASA Line Pitch=−4 DASA points/hour, the SA Penalty=−24 DASA points. For example, in one or more embodiments, with CSD=6 hours and DASA Line Pitch=−2 points/hour, the SA Penalty=−12 DASA points.

According to one or more embodiments, the SA penalty caused by sleep deprivation may be low for users with short Binertia values, wherein Binertia is the product of RTW and RTP, as discussed above. Using the calculated SA penalty, the processor 100 may generate performance assessment influences, and personal training strategies therefrom.

By way of one or more embodiments, use of the DASA system by the user and the one or more second users, and resulting DASA diagrams, are depicted in FIGS. 11-19.

Figure 11:
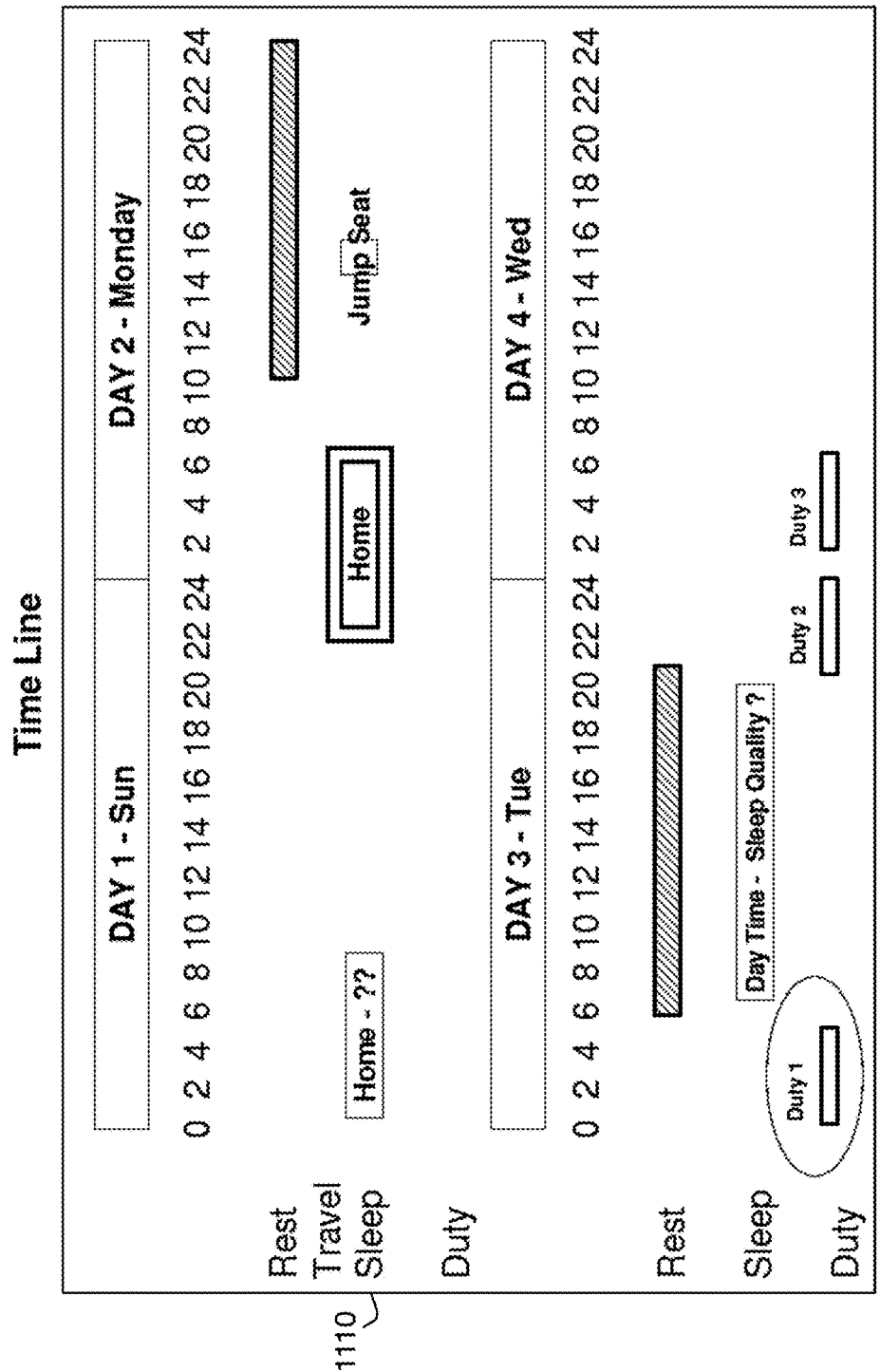
FIG. 11 shows an exemplary diagram of input data from a user indicating sleep behavioral data.
Figure 13:
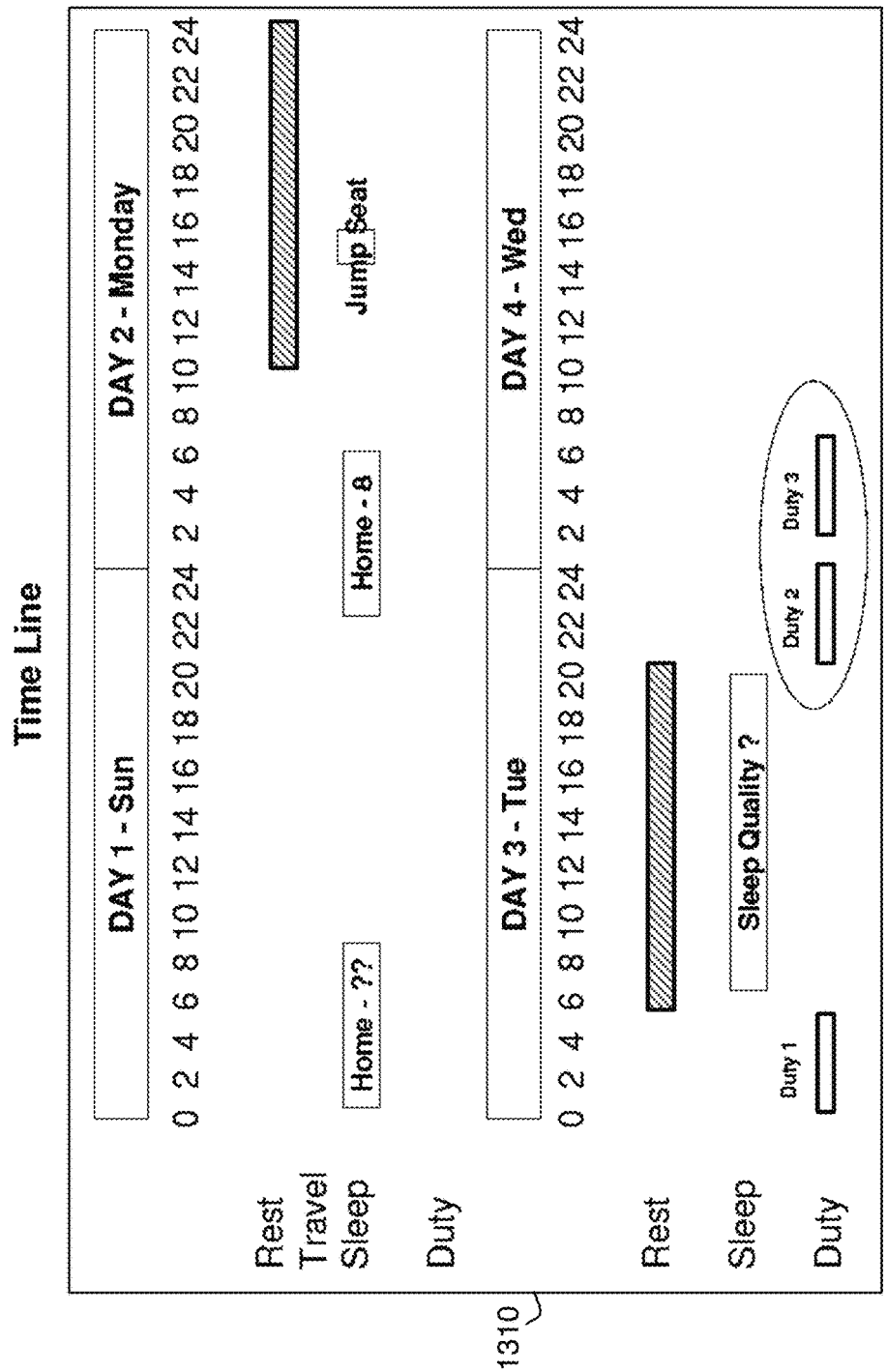
FIG. 13 shows an exemplary diagram of input data from a user indicating sleep behavioral data.

FIG. 11 and FIG. 13 show exemplary diagrams of input data from a user indicating sleep behavioral data, according to one or more embodiments of the invention. In at least one embodiment of the invention, the processor 100 may determine current DSD and CSD to adjust a level of the DASA performance line.

Figure 17:
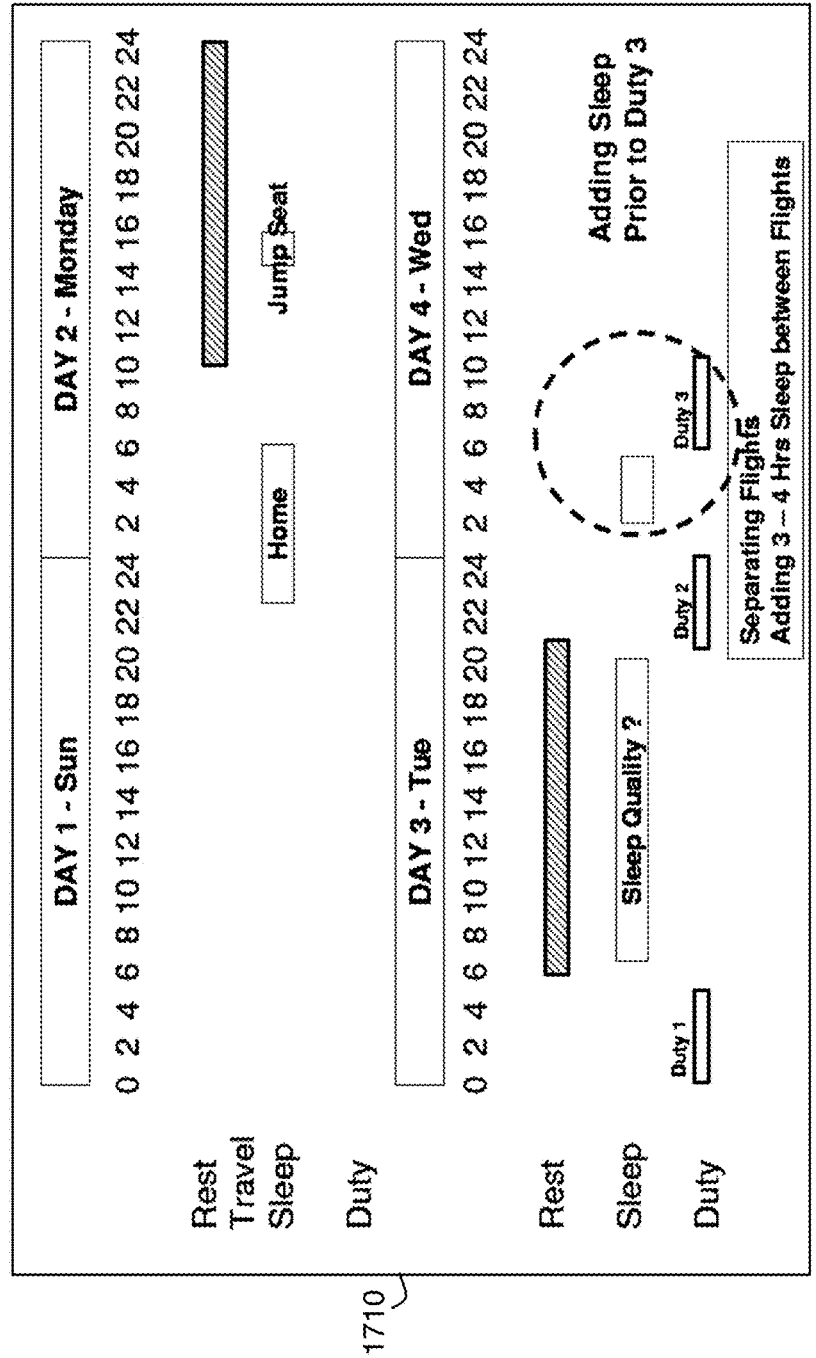
FIG. 17 shows an exemplary diagram of input data from a user indicating sleep behavioral data with additional hours of sleep.

As shown in FIG. 11, FIG. 13 and FIG. 17, in at least one embodiment of the invention, the DASA system enables a user to input sleep behavioral data including hours of sleep, location of sleep and type of sleep for one or more days prior to the scheduled trip or task, into a displayed user program shown at 1110, 1310 and 1710, respectively.

In one or more embodiments, the user may enter whether the sleep data entered corresponds to sleep that occurred within a home, within a car, within an aircraft, or any other location. In one or more embodiments, the user may enter quality of sleep for each entry of sleep behavioral data, such as poor, good, excellent, etc. In at least one embodiment, the quality of sleep entered may be a number within a predetermined range indicating poor to excellent sleep quality, such that the lowest value within the range indicates worst sleep quality, and the highest value within the range indicates best sleep quality. In one or more embodiments, the user may enter one or more of a date of task or assignment, type of task or assignment, a time of day of task or assignment, a time period of task or assignment, which shift of one or more shifts corresponds to the task or assignment, and a number of shifts per day.

According to one or more embodiments, for example, once a user, or an equipment operator such as a truck driver, aircraft pilot, air traffic controller (ATC), etc., has established a DASA account using the DASA system, and has provided the personal data required to establish a personal profile, the processor 100 allows the user to provide daily information on the length of his or her sleep. In at least one embodiment, the processor 100 may keep track of the user's sleep history and may calculate for a particular work day, a several days CSD, such as a 5-day cumulative sleep deprivation, and assign 1-hour credit for the natural recovery for each of 4 days. In one or more embodiments of the invention, the processor 100 may calculate sleep deprivation as the difference between the 8-hour sleep requirement minus the actual hours slept. By way of at least one embodiment, if the sleep deprivation has been 2 hours each night for all 5 nights prior to a particular workday, processor 100 may calculate the cumulative sleep deprivation as 10 hours minus 4 hours of natural recovery, resulting in a net CSD of 6 hours. In at least one embodiment of the invention, if this 6-hour CSD were applicable to the user represented in FIG. 8, the DASA performance line in FIG. 8 would have to be shifted horizontally to the left by 6 hours of wakefulness hours.

For example, as shown in 1110, the user may enter Home and Jump Seat of an aircraft, or any other seat of an operating vehicle, as the location of sleep, hours 10 to 24 as the number of hours of sleep for Day 2, hours 6-20 as the number of hours for Day 3, and Duty 1 as the shift slot for the assigned task or assignment.

Referring to FIG. 13, as shown in 1310, the user for example may enter Home and Jump Seat of an aircraft, or any other seat of an operating vehicle, as the location of sleep, hours 10 to 24 as the number of hours of sleep for Day 2, hours 6-20 as the number of hours for Day 3, and Duty 2 and Duty 3 as the shift slots for the assigned task or assignment.

Figure 12:
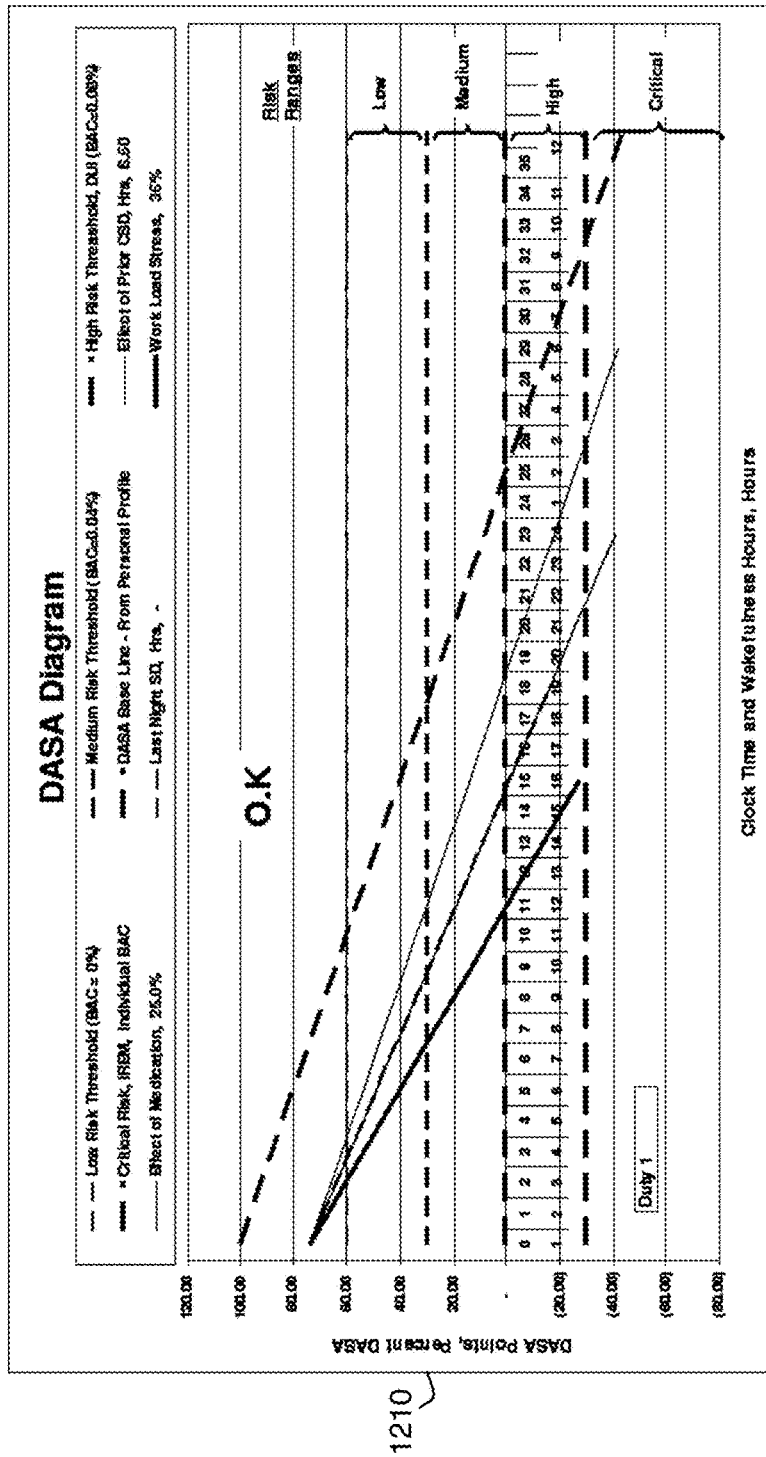
FIG. 12 shows an exemplary diagram of the dynamic assessment of situational awareness of the sleep behavioral data of FIG. 10 indicating the user's situational awareness in a first duty time period.

FIG. 12 shows an exemplary diagram of the dynamic assessment of situational awareness of the sleep behavioral data of FIG. 11 indicating the user's situational awareness in a first duty time period, according to one or more embodiments of the invention. As shown in FIG. 12, for example, the processor 100 may generate a DASA diagram 1210 based on the user input data entered into the user program of the DASA system of FIG. 11. In at least one embodiment of the invention, the DASA diagram 1210 is a diagram for Day 3, as a result of perfect sleep quality during jump seat travel on Day 2 of 1.5 hours out of 1.5 hours, and perfect sleep quality of day-time rest of 9 hours out of 9 hours.

In one or more embodiments, the DASA diagram 1210 depicts the various risk thresholds, DASA points, effect of medication, effects of work load stress, effect of CSD, and effect of the prior night's sleep deprivation information, that correspond with the user's input data, for example as shown in FIG. 11. As shown in FIG. 12, the processor 100 may indicate to the user and/or the one or more second users wherein the user is in a ready, okay or suitable condition, to perform the assigned task or assignment.

Figure 14:
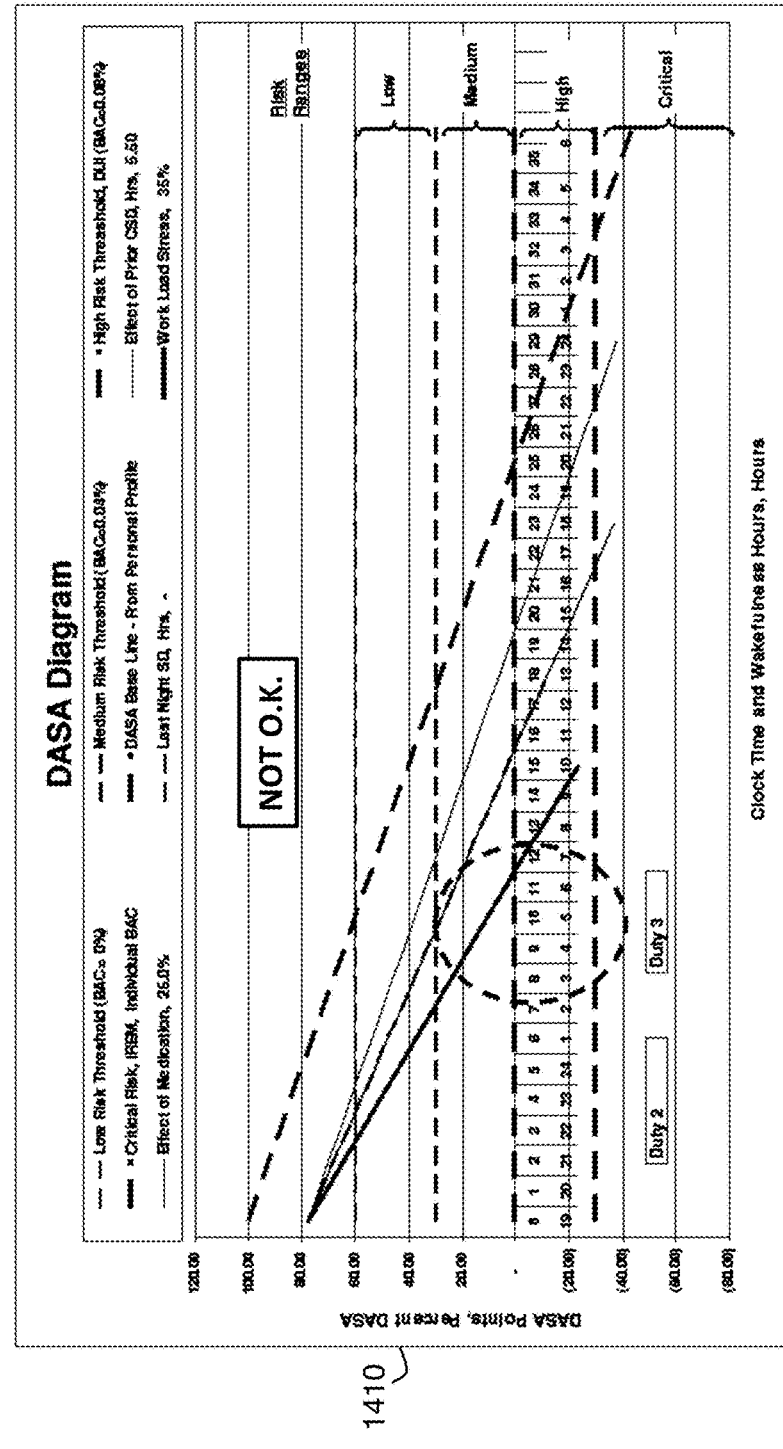
FIG. 14 shows an exemplary diagram of the dynamic assessment of situational awareness of the sleep behavioral data of FIG. 12 indicating the user's situational awareness longevity conditions and advanced fatigue conditions in a third duty time period with perfect sleep quality.

FIG. 14 shows an exemplary diagram of the dynamic assessment of situational awareness of the sleep behavioral data of FIG. 13 indicating the user's situational awareness longevity conditions and advanced fatigue conditions in a third duty time period with perfect sleep quality, according to one or more embodiments of the invention. As shown in FIG. 14, for example, the processor 100 may generate a DASA diagram 1410 based on the user input data entered into the user program of the DASA system of FIG. 13. In at least one embodiment of the invention, the DASA diagram 1410 is a diagram of Day 4, as a result of perfect sleep quality during jump seat travel on Day 2 of 1.5 hours out of 1.5 hours, and perfect sleep quality of day-time rest of 9 hours out of 9 hours.

In one or more embodiments, the DASA diagram 1410 depicts the various risk thresholds, DASA points, effect of medication, effects of work load stress, effect of CSD, and effect of the prior night's sleep deprivation information, that correspond with the user's input data, for example as shown in FIG. 13. As shown in FIG. 14, the processor 100 may indicate to the user and/or the one or more second users wherein the user is in a non-ready, not okay, or unsuitable condition, to perform the assigned task or assignment, for example especially regarding Duty Period 3.

Figure 15:
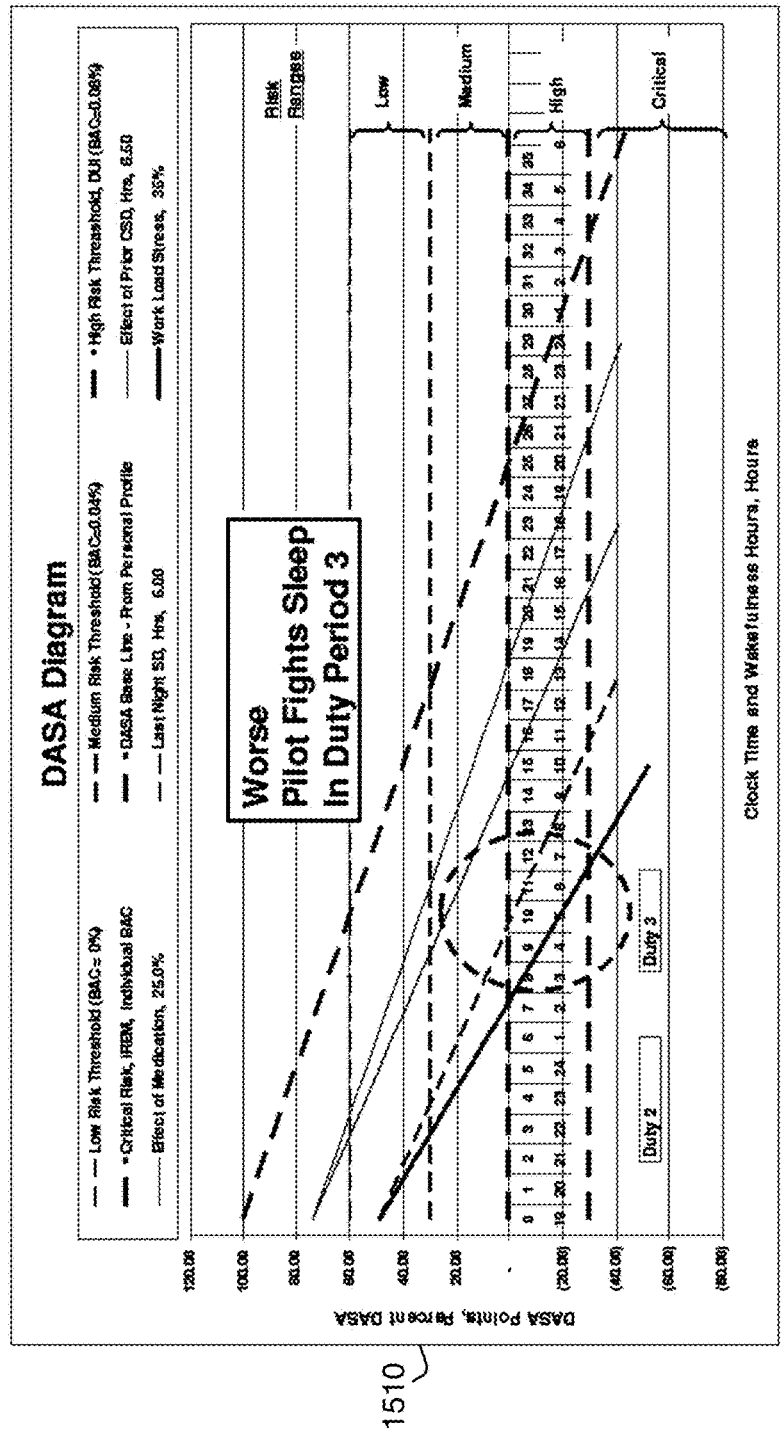
FIG. 15 shows an exemplary diagram of the dynamic assessment of situational awareness of the sleep behavioral data of FIG. 12 indicating the user's situational awareness longevity conditions and advanced fatigue conditions in a third duty time period with poor sleep quality.

FIG. 15 shows an exemplary diagram of the dynamic assessment of situational awareness of the sleep behavioral data of FIG. 13 indicating the user's situational awareness longevity conditions and advanced fatigue conditions in a third duty time period with poor sleep quality, according to one or more embodiments of the invention.

As shown in FIG. 15, for example, the processor 100 may generate a DASA diagram 1510 based on the user input data entered into the user program of the DASA system of FIG. 13. In at least one embodiment of the invention, the DASA diagram 1510 is a diagram of Day 4, as a result of poor sleep quality during jump seat travel on Day 2 of 0.5 hours out of 1.5 hours, and poor sleep quality of day-time rest at a remote facility, such as an airport facility, of 3 hours out of 9 hours.

In one or more embodiments, the DASA diagram 1510 depicts the various risk thresholds, DASA points, effect of medication, effects of work load stress, effect of CSD, and effect of the prior night's sleep deprivation information, that correspond with the user's input data, for example as shown in FIG. 13. As shown in FIG. 15, the processor 100 may indicate to the user and/or the one or more second users wherein the user is in a worst condition to perform the assigned task or assignment, for example especially regarding Duty Period 3. For example, in at least one embodiment, the processor 100 may indicate wherein the user, or pilot, will fight sleep in Duty Period 3.

Figure 16:
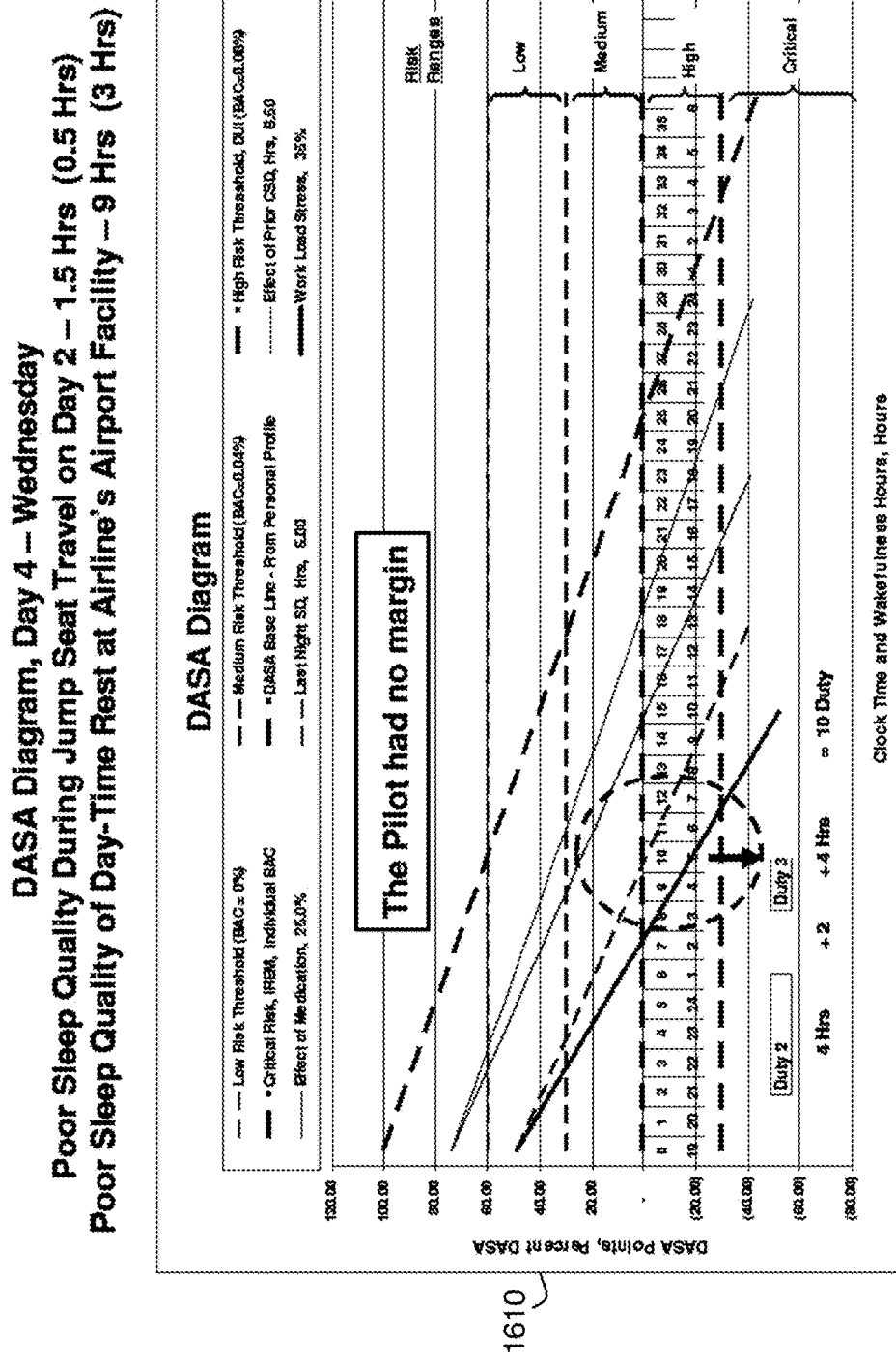
FIG. 16 shows an exemplary diagram of the dynamic assessment of situational awareness of the sleep behavioral data of FIG. 12 indicating the user's situational awareness longevity conditions and advanced fatigue conditions in a third duty time period with poor sleep quality wherein the user has no margin.

FIG. 16 shows an exemplary diagram of the dynamic assessment of situational awareness of the sleep behavioral data of FIG. 13 indicating the user's situational awareness longevity conditions and advanced fatigue conditions in a third duty time period with poor sleep quality wherein the user has no margin, according to one or more embodiments of the invention. According to at least one embodiment, the user having no margin may indicate wherein there is no alertness margin as required to prevent false decision making, accidents, errors, etc.

As shown in FIG. 16, for example, the processor 100 may generate a DASA diagram 1610 based on the user input data entered into the user program of the DASA system of FIG. 13. In at least one embodiment of the invention, the DASA diagram 1610 is a diagram of Day 4, as a result of poor sleep quality during jump seat travel on Day 2 of 0.5 hours out of 1.5 hours, and poor sleep quality of day-time rest at a remote facility, such as an airport facility, of 3 hours out of 9 hours.

In one or more embodiments, the DASA diagram 1610 depicts the various risk thresholds, DASA points, effect of medication, effects of work load stress, effect of CSD, and effect of the prior night's sleep deprivation information, that correspond with the user's input data, for example as shown in FIG. 13. As shown in FIG. 15, the processor 100 may indicate to the user and/or the one or more second users wherein the user has no margin to perform the assigned task or assignment at a specific time period within the scheduled duty period before the duty period ends, for example especially regarding Duty Period 3. For example, in at least one embodiment, the processor 100 may indicate wherein the user, or pilot, will not be aware after a specific time during the Duty 3 time period before the duty time period ends.

For example, according to at least one embodiment of the invention, as shown in FIG. 16, the processor 100 may generate a reconstruction of an accident, based on the user input data, wherein a user's duty or task time period reaches into the user's high performance fatigue time and high risk threshold, with equivalent BAC (E-BAC) exceeding 0.08%. In one or more embodiments of the invention, a user's duty or task time period reaching into the user's high performance fatigue time and high risk threshold may cause several human errors, and eventually may result in a serious accident.

FIG. 17 shows an exemplary diagram of input data from a user indicating sleep behavioral data with additional hours of sleep, according to one or more embodiments of the invention. As shown in FIG. 17, and depicted in user program display 1710, the user may enter a number of additional hours of sleep between tasks or assignments, such as flights if the user is a pilot, and enter when the number of additional hours of sleep occurs regarding which day, time of day and between which duty time periods.

Figure 18:
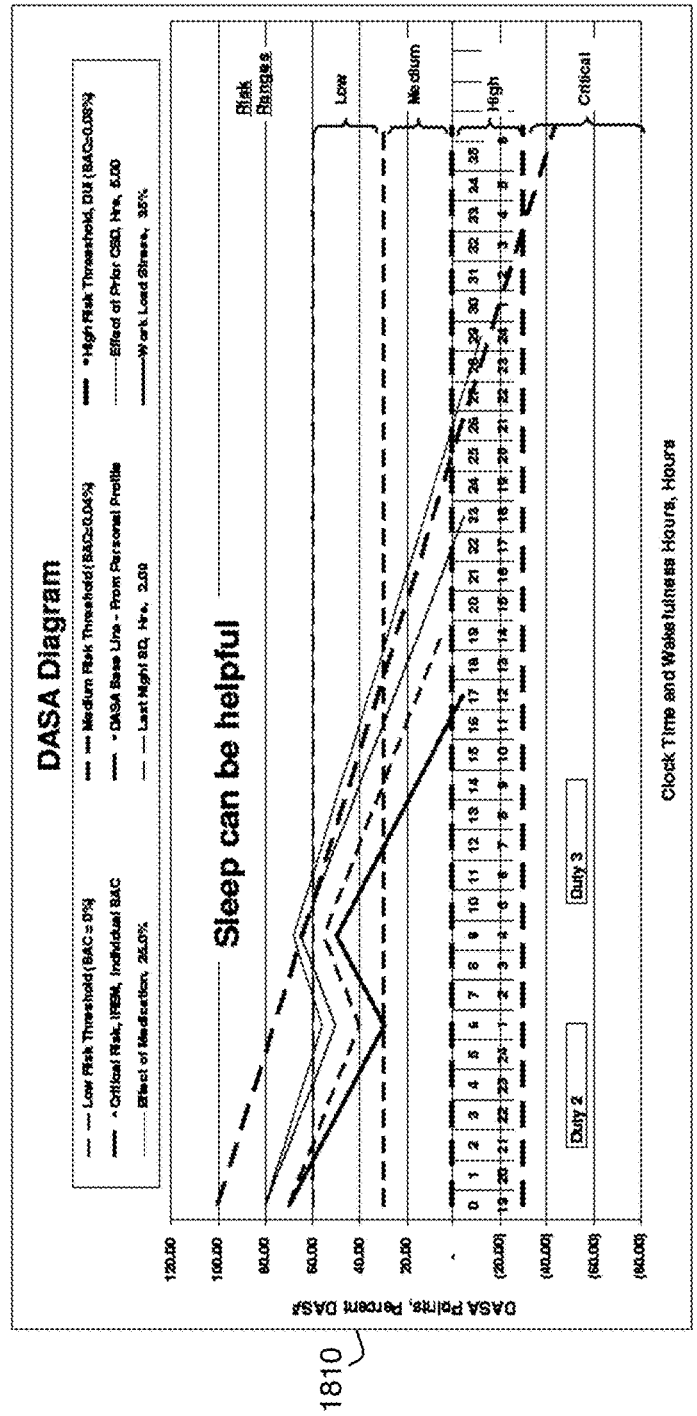
FIG. 18 shows an exemplary diagram of the dynamic assessment of situational awareness of the sleep behavioral data of FIG. 16 depicting how sleep affects the user's situational awareness; and, FIG. 19 shows an exemplary diagram of the dynamic assessment of situational awareness of the sleep behavioral data of FIG. 16 depicting improvements of situational awareness performance; according to one or more embodiments of the invention.

FIG. 18 shows an exemplary diagram of the dynamic assessment of situational awareness of the sleep behavioral data of FIG. 17 depicting how sleep affects the user's situational awareness, according to one or more embodiments of the invention. As shown in FIG. 18, the processor 100 may generate DASA diagram 1810 depicting how the additional number of hours of sleep, entered by the user into the DASA system, increases the user's situational awareness.

Figure 19:
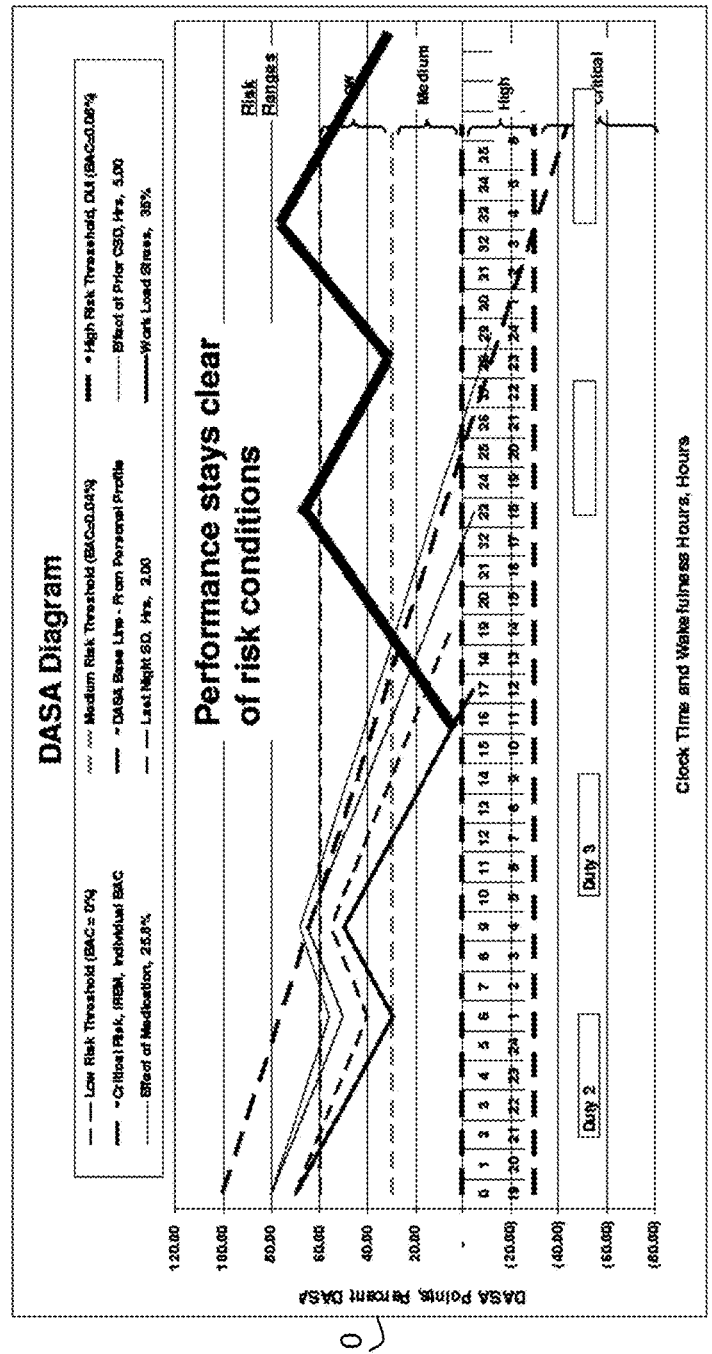

FIG. 19 shows an exemplary diagram of the dynamic assessment of situational awareness of the sleep behavioral data of FIG. 17 depicting improvements of situational awareness performance, according to one or more embodiments of the invention. As shown in FIG. 19, the processor 100 may generate DASA diagram 1910 depicting and forecasting the user's performance, risk threshold and situational awareness. For example, as shown in diagram 1910, based on the data as entered in 1710, the processor 100 may forecast wherein the user will be clear of risk conditions and enter a low risk threshold if the user sleeps a specific number of additional hours of sleep, as shown in 1810.

In at least one embodiment, the processor 100 may generate personal training for responsible activity management that reduce a user's sleep deprivation, stress and drug dependency, and increase the user's situational awareness, performance and longevity. In one or more embodiments of the invention, the processor 100 may identify one or more users with inconsistent performance reflected by differences in day-to-day binertia values, calculated as discussed above. In at least one embodiment, the processor day detect one or more inconsistencies for the one or more users and indicate whether the one or more users are capable of performing the one or more tasks during the one or more user's regular wake times. For example, by way of at least one embodiment, the processor 100 may detect one or more indications of the user's sleep quality even if the user's RTP remains consistent at high values and the user improves his or her RTW. For example, in one or more embodiments of the invention, the processor 100 may detect one or more indications of the user's dynamics in decision making, regarding the one or more tasks assigned to the user, even if the user's RTW remain consistent at high values and the user improves his or her RTP.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A situational awareness analysis and fatigue management system comprising:
 a processor;
 wherein said processor
  receives input data from a user, displays a series of dynamic psychomotor vigilance tests (D-PVT) to said user requiring said user to respond to stimulus, accepts successive input data to said series of D-PVT, calculates a D-PVT performance data, said D-PVT performance data is a difference in time between said successive input data in response to said series of D-PVT as a measure of said user's change in response time in responding to said stimulus in milliseconds (msec) for each of said series of D-PVT, calculates a situational awareness performance data and a wakefulness hours data from said input data and said D-PVT performance data, and generates a dynamic assessment situational awareness (DASA) diagram of said user as a function of said situational awareness performance data and said wakefulness hours data of said user;

wherein, using said DASA diagram, said processor receives a task schedule from said user, identifies situational awareness longevity conditions of said user to perform said task schedule based at least on said difference in time between said successive input data in response to said series of D-PVT, forecasts advanced fatigue conditions of said user based on said identified situational awareness longevity conditions, identifies improvements of situational awareness performance of said user to perform said task schedule, creates a new optimized task schedule based on said task schedule, said situational awareness longevity conditions, said advanced fatigue conditions, and said improvements of situational awareness performance, and, displays said situational awareness longevity conditions of said user, said advanced fatigue conditions of said user, said improvements of situational awareness performance of said user to perform said task schedule, and said new optimized task schedule to one or more second users.

2. The situational awareness analysis and fatigue management system of claim 1, wherein said input data comprises personal data of said user including height, weight and inseam of said user and a birth year and birth month of said user.

3. The situational awareness analysis and fatigue management system of claim 2, wherein said processor calculates age, body mass index (BMI), and skin-to-mass ratio (SMR) values of said user using said personal data.

4. The situational awareness analysis and fatigue management system of claim 3, wherein said processor calculates a bioelectric impedance (BEI) value and a proportionality factor of said (BEI) as a function of said age, BMI and SMR values of said user.

5. The situational awareness analysis and fatigue management system of claim 1, wherein said processor generates and displays a bar chart comprising said D-PVT measure.

6. The situational awareness analysis and fatigue management system of claim 5, wherein said processor applies linear regression analysis to said bar chart to determine a trend of said user's response time as a function of wakefulness hours and display a trend line depicting said trend.

7. The situational awareness analysis and fatigue management system of claim 6, wherein said processor calculates a response time at wake-up (RTW) of said user, wherein said RTW is depicted on said bar chart as said trend line intercepts a y-axis of said bar chart at zero wakefulness hours, and wherein said RTW indicates a user's situational awareness.

8. The situational awareness analysis and fatigue management system of claim 6, wherein said processor calculates a response time pitch (RTP) of said user as a change in said user's response time per hour of wakefulness, and wherein said RTP indicates said user's longevity of effective performance.

9. The situational awareness analysis and fatigue management system of claim 8, wherein said change in said user's response time comprises an average rise in said user's response time.

10. The situational awareness analysis and fatigue management system of claim 6, wherein said processor calculates a response time at wake-up (RTW) of said user in milliseconds, wherein said user's RTW is depicted on said bar chart as said trend line intercepts a y-axis of said bar chart at zero wakefulness hours, and wherein said user's RTW indicates a user's situational awareness;

calculates a response time pitch (RTP) of said user as an average rise in said user's response time per hour of wakefulness in milliseconds per hour, and wherein said RTP indicates said user's longevity of effective performance; and, calculates a bio-inertia as a product of said RTW and said RTP.

11. The situational awareness analysis and fatigue management system of claim 10, wherein said processor generates a dynamic psychomotor vigilance test (D-PVT) diagram displaying performance regions and iso-binertia lines of said user using said calculated RTW, RTP and bio-inertia.

12. The situational awareness analysis and fatigue management system of claim 11, wherein said performance regions include a first performance region below a first pre-determined iso-binertia line, wherein said first performance region indicates a best performance of said user and a best response time of said user;

a second performance region between said first iso-binertia line and a second iso-binertia line, wherein said second performance region indicates a good performance of said user and a good response time of said user; and, a third performance region above said second iso-binertia line, wherein said third performance region indicates a poor performance of said user and a poor response time of said user.

13. The situational awareness analysis and fatigue management system of claim 1, wherein said input data comprises sleep behavioral data of said user.

14. The situational awareness analysis and fatigue management system of claim 13, wherein said processor calculates daily sleep deprivation (DSD) and cumulative sleep deprivation (CSD) of said user using said sleep behavioral data.

15. The situational awareness analysis and fatigue management system of claim 13, wherein said processor calculates sleep deprivation of said user from said sleep behavioral data as a difference between 8 hours and actual hours slept.

16. The situational awareness analysis and fatigue management system of claim 1, wherein said input data comprises medication data of said user, wherein said medication data comprises a drowsiness effect of said medication on said user.

17. The situational awareness analysis and fatigue management system of claim 1, wherein said input data comprises performance risk thresholds including blood alcohol content (BAC) thresholds and pre-rapid-eye-movement stage (iREM) thresholds of said user, wherein said iREM depicts wherein optical stimuli of said user are processed with a delay and a long response time or no response time from said user.

18. The situational awareness analysis and fatigue management system of claim 17, wherein said processor
generates a situational awareness scale as a function of situational awareness and wakefulness hours of said user depicting four levels of situational awareness associated with said performance risk thresholds,
wherein said four levels of situational awareness comprise
a low performance risk threshold equivalent to a 0% BAC,
a medium performance risk threshold equivalent to 0.04% BAC,
a high performance risk threshold equivalent to 0.08% BAC, and,
a critical performance risk threshold equivalent to iREM.

19. The situational awareness analysis and fatigue management system of claim 1, wherein said user comprises a driver of an operating equipment.

20. A situational awareness analysis and fatigue management system to optimize a user's task schedule comprising:
a processor;
wherein said processor
receives input data from a user, wherein said input data comprises a plurality of groups of input data,
selects a set of functions for each group of said plurality of groups of input data,
calculates outputs of each of said set of functions from said input data, and,
generates and displays to said user a dynamic assessment situational awareness (DASA) diagram of said user as a function of situational awareness performance and wakefulness hours of said user from said output,
displays a series of dynamic psychomotor vigilance tests (D-PVT) to said user requiring said user to respond to stimulus,
accepts successive input data to said series of D-PVT,
calculates a difference in time between said successive input data in response to said series of D-PVT as a measure of said user's change in response time in responding to said stimulus in milliseconds (msec) for each of said series of D-PVT;
wherein, using said DASA diagram, said processor
receives a task schedule from said user,
identifies situational awareness longevity conditions of said user to perform said task schedule based at least on said difference in time between said successive input data in response to said series of D-PVT and said input data,
forecasts advanced fatigue conditions of said user based on said identified situational awareness longevity conditions,
identifies improvements of situational awareness performance of said user to perform said task,
creates a new optimized task schedule based on said task schedule, said situational awareness longevity conditions, said advanced fatigue conditions, and said improvements of situational awareness performance, and
displays said identified situational awareness longevity conditions of said user, said forecast of advanced fatigue conditions of said user and said improvements of situational awareness performance of said user to perform said task schedule, and said new optimized task schedule to one or more second users; and,
wherein said input data comprises
personal data of said user including height, weight and inseam of said user and a birth year and birth month of said user,
wherein said processor calculates age, body mass index (BMI), and skin-to-mass ratio (SMR) values of said user using said personal data, and,
wherein said processor calculates a bioelectric impedance (BEI) value and a proportionality factor of said (BEI) as a function of said age, BMI and SMR values of said user;
sleep behavioral data of said user;
medication data of said user, wherein said medication data comprises a drowsiness effect of said medication on said user; and,
performance risk thresholds including blood alcohol content (BAC) thresholds and pre-REM stage (iREM) thresholds of said user,
wherein said iREM depicts wherein optical stimuli of said user are processed with a delay and a long response time or no response time from said user.

* * * * *